US011128982B1

(12) United States Patent
Begleiter et al.

(10) Patent No.: US 11,128,982 B1
(45) Date of Patent: Sep. 21, 2021

(54) AUTOMATIC BUILDING DETECTION AND CLASSIFICATION USING ELEVATOR/ESCALATOR STAIRS MODELING

(71) Applicant: HERE Global B.V., Eindhoven (NL)

(72) Inventors: Ron Begleiter, Tel Aviv (IL); Ofri Rom, Ganey Tiqwa (IL)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/911,067

(22) Filed: Jun. 24, 2020

(51) Int. Cl.
| | | |
|---|---|---|
| *H04W 4/33* | (2018.01) | |
| *H04W 4/024* | (2018.01) | |
| *G06N 3/08* | (2006.01) | |
| *G01C 21/20* | (2006.01) | |
| *H04W 4/38* | (2018.01) | |

(52) U.S. Cl.
CPC .......... *H04W 4/024* (2018.02); *G01C 21/206* (2013.01); *G06N 3/08* (2013.01); *H04W 4/33* (2018.02); *H04W 4/38* (2018.02)

(58) Field of Classification Search
CPC ................................. H04W 4/02; H04W 4/029
See application file for complete search history.

(56) References Cited

U.S. PATENT DOCUMENTS

| | | | | |
|---|---|---|---|---|
| 8,849,308 | B2 * | 9/2014 | Marti | .................... G01C 21/206 455/456.2 |
| 9,234,965 | B2 * | 1/2016 | Venkatraman | .......... G01S 19/46 |
| 2015/0149133 | A1 | 5/2015 | Do | |
| 2015/0153380 | A1 | 6/2015 | Elhoushi et al. | |
| 2018/0252535 | A1 | 9/2018 | Bhimavarapu et al. | |
| 2019/0025062 | A1 | 1/2019 | Young et al. | |
| 2019/0300333 | A1 * | 10/2019 | Simcik | ...................... B66B 1/28 |
| 2019/0371138 | A1 * | 12/2019 | Molloy | .................. G01C 21/34 |

OTHER PUBLICATIONS

Alzantot et al., "Crowdinside: Automatic Construction of Indoor Floorplans", Sep. 17, 2012, 11 pages.
Aly et al., "Map++: A Crowd-sensing System for Automatic Map Semantics Identification", Jul. 31, 2015, 9 pages.
Stenneth, "Detecting Human Activities Using Smartphones and Maps", Thesis, retrieved on Jun. 24, 2020 from https://www.cs.uic.edu/~lstennet/thesis_friends%20and%20families.pdf, 207 pages.
Kaiser et al., "Integrating Moving Platforms in a SLAM Algorithm for Pedestrian Navigation", Dec. 10, 2018, 21 pages.
Falcon et al., "Predicting Floor Level for 911 Calls with Neural Networks and Smartphone Sensor Data", Sep. 15, 2018, 16 pages.

* cited by examiner

*Primary Examiner* — Michael T Vu
(74) *Attorney, Agent, or Firm* — Ditthavong, Steiner & Mlotkowski

(57) ABSTRACT

A system, a method and a computer program product are provided for determining one or more transport modes for one or more buildings in a geographic region, using a machine learning model. The system may include at least one memory configured to store computer executable instructions and at least one processor configured to execute the computer executable instructions to obtain sensor data associated with the one or more buildings for time duration. The processor may be configured to determine mobility features associated with the one or more buildings, based on the sensor data. The processor may be further configured to determine, using a trained machine learning model, the one or more transport modes for the one or more buildings, based on the mobility features.

20 Claims, 14 Drawing Sheets

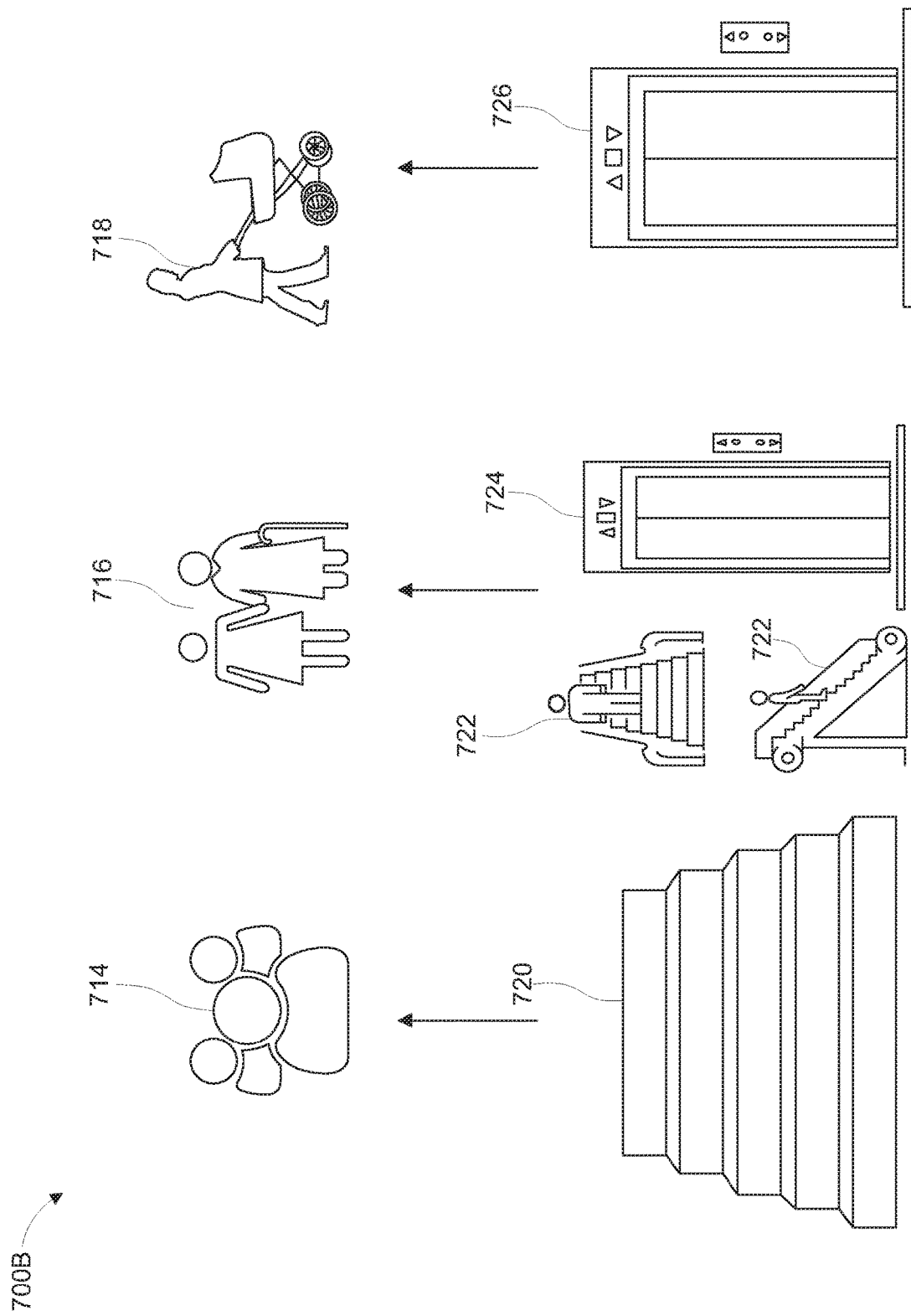

AUTOMATIC BUILDING DETECTION AND CLASSIFICATION USING ELEVATOR/ESCALATOR STAIRS MODELING

TECHNOLOGICAL FIELD

An example embodiment of the present invention generally relates to determining transport modes for one or more buildings, and more particularly relates to a system, a method, and a computer program product for using a trained machine learning model for determining the transport modes which may be further utilized for mapping and navigation applications.

BACKGROUND

Mobile industry has witnessed a rise in context aware mobile services that collect sensor data from mobile phone users, analyze sensor data sets from the sensor data to identify attributes that may be further used to serve users (such as, the mobile phone users). Consequently, sensor data driven service innovation may be at rise, where mobile service ideas or applications are generated based on patterns related to individuals as well as social networks. Such applications may create compelling user experiences based on the patterns extracted from the sensor data of mobile phones of users. Also, such patterns may be used for planning additional infrastructure for buildings, commute modes for the buildings or in the adverse cases, for determining emergency responses for buildings and infrastructures. In certain scenarios, there are applications (such as, but not limited to, navigation applications) where inaccurate determination of patterns may mar user experience and usability. In such scenarios, the applications may present a challenge and fail to satisfy accuracy demands of services (such as, location based services) and other planning related to the buildings and infrastructures.

BRIEF SUMMARY

Accordingly, there is a need for determination of transport modes (such as, elevators, escalators, and stairs) for one or more buildings from sensor data obtained from one or more user equipment (UE). The determination of transport modes may further be used to determine mobility patterns associated with user activities that are unique to each activity to be detected.

Data regarding the user activities derived from the UE (such as, mobile phones) may facilitate data service innovations where mobile services are created based on the mobility patterns related to individuals and communities. The user activities may provide insights into a number of services, such as, but not limited to, street parking status, street congestion and city level planning.

The present disclosure provides a system, a method and a computer program product to determine one or more transport modes for one or more buildings in a geographic region, using a trained machine learning model, in accordance with various embodiments.

Embodiments of the disclosure provide a system for determining one or more transport modes for one or more buildings in a geographic region. The system may comprise at least one non-transitory memory configured to store computer executable instructions and at least one processor (also referred to as a processor) configured to execute the computer executable instructions to obtain sensor data associated with the one or more buildings for a time duration.

In accordance with an embodiment, the processor may be further configured to determine one or more mobility features associated with the one or more buildings, based on the sensor data.

In accordance with an embodiment, the processor may be further configured to determine, using a trained machine learning model, the one or more transport modes for the one or more buildings, based on the mobility features.

In accordance with an embodiment, the processor may be further configured to update map data associated with the one or more buildings, based on the determined one or more transport modes.

In accordance with an embodiment, the processor may be further configured to obtain the sensor data from one or more user equipment.

In accordance with an embodiment, the processor may be further configured to calculate confidence scores for each of the mobility features. The confidence scores may correspond to a rank of each of the mobility features. An order of the rank may start with a top ranked mobility feature that may correspond to a most informative mobility feature.

In accordance with an embodiment, the processor may be further configured to determine a mobility feature vector of each of the mobility features. The mobility feature vector may correspond to a numerical representation of the one or more transport modes.

In accordance with an embodiment, the processor may be further configured to classify the one or more transport modes using the trained machine learning model, based on the mobility feature vector.

In accordance with an embodiment, for determination of the one or more transport modes, the processor may be further configured to, reject the one or more transport modes using the trained machine learning model, based on a difference of subsequent confidence scores of the mobility features being less than a threshold value.

In accordance with an embodiment, the one or more transport modes may comprise at least one of a stair, an elevator, an escalator or none.

In accordance with an embodiment, the mobility features may comprise one or more of spatial features, temporal features, and statistical features.

In accordance with an embodiment, the mobility features may correspond to one or more attributes of the one or more transport modes in the one or more buildings. The one or more attributes may comprise one or more of vertical mobility signals and transport mode usage at predefined epoch.

In accordance with an embodiment, the processor may be further configured to transmit the updated map data to at least one subject. The subject may comprise at least one of a vehicle or user equipment.

In accordance with an embodiment, the machine learning model may correspond to a selective-learning machine learning model.

Embodiments of the disclosure provide a method for determining one or more transport modes for one or more buildings in a geographic region. The method may comprise obtaining sensor data associated with the one or more buildings for a time duration, determining mobility features associated with the one or more buildings, based on the sensor data, and determining, using a trained machine learning model, the one or more transport modes for the one or more buildings, based on the mobility features.

Embodiments of the disclosure provide a computer program product comprising at least one non-transitory computer-readable storage medium having stored thereon computer-executable instructions which when executed by a computer, cause the computer to carry out operations for determining the one or more transport modes The operations may comprise obtaining sensor data associated with the one or more buildings for a time duration, determining mobility features associated with the one or more buildings, based on the sensor data, and determining, using a trained machine learning model, the one or more transport modes for the one or more buildings, based on the mobility features.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
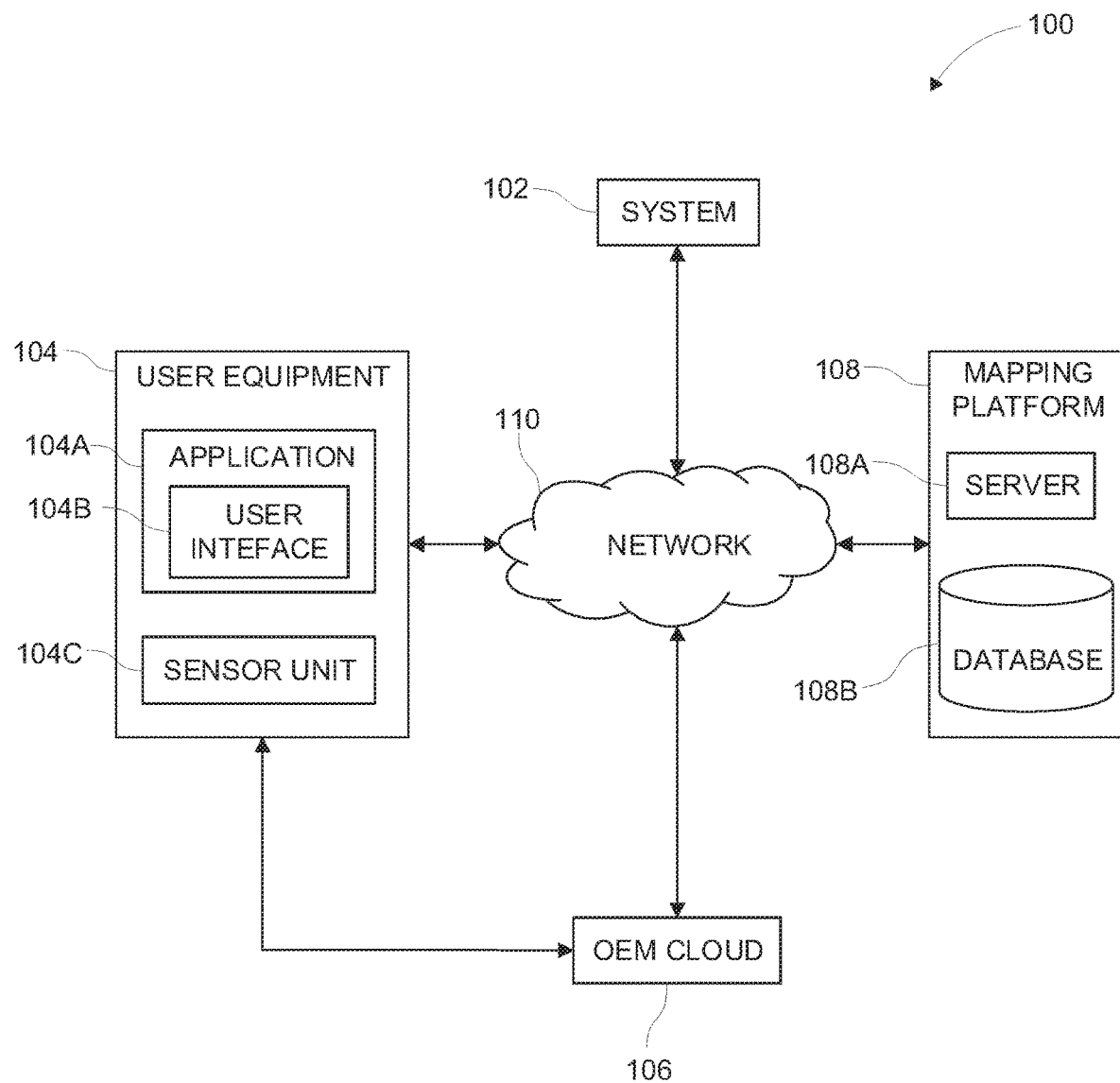
Figure 2:
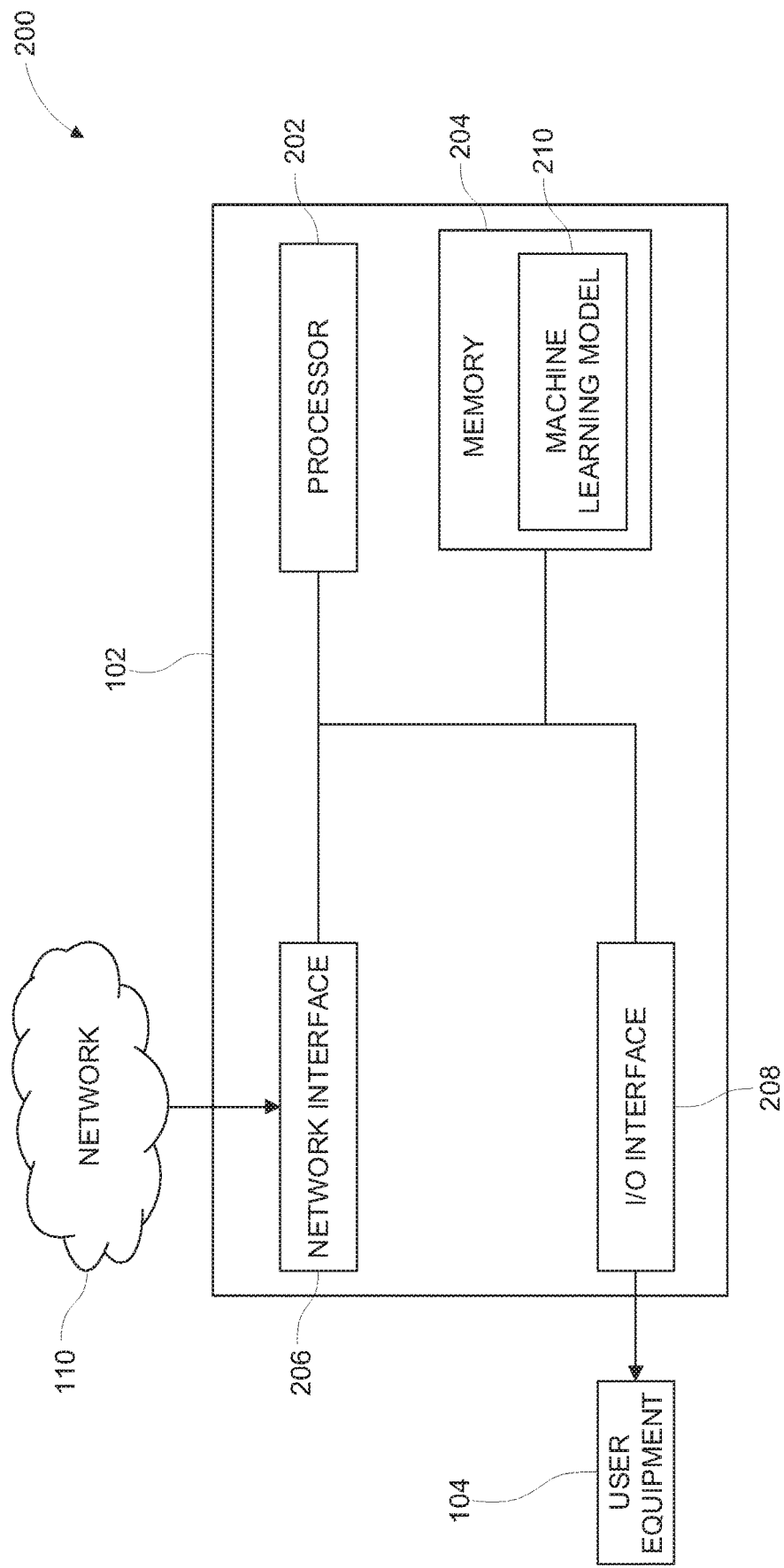
Figure 3:
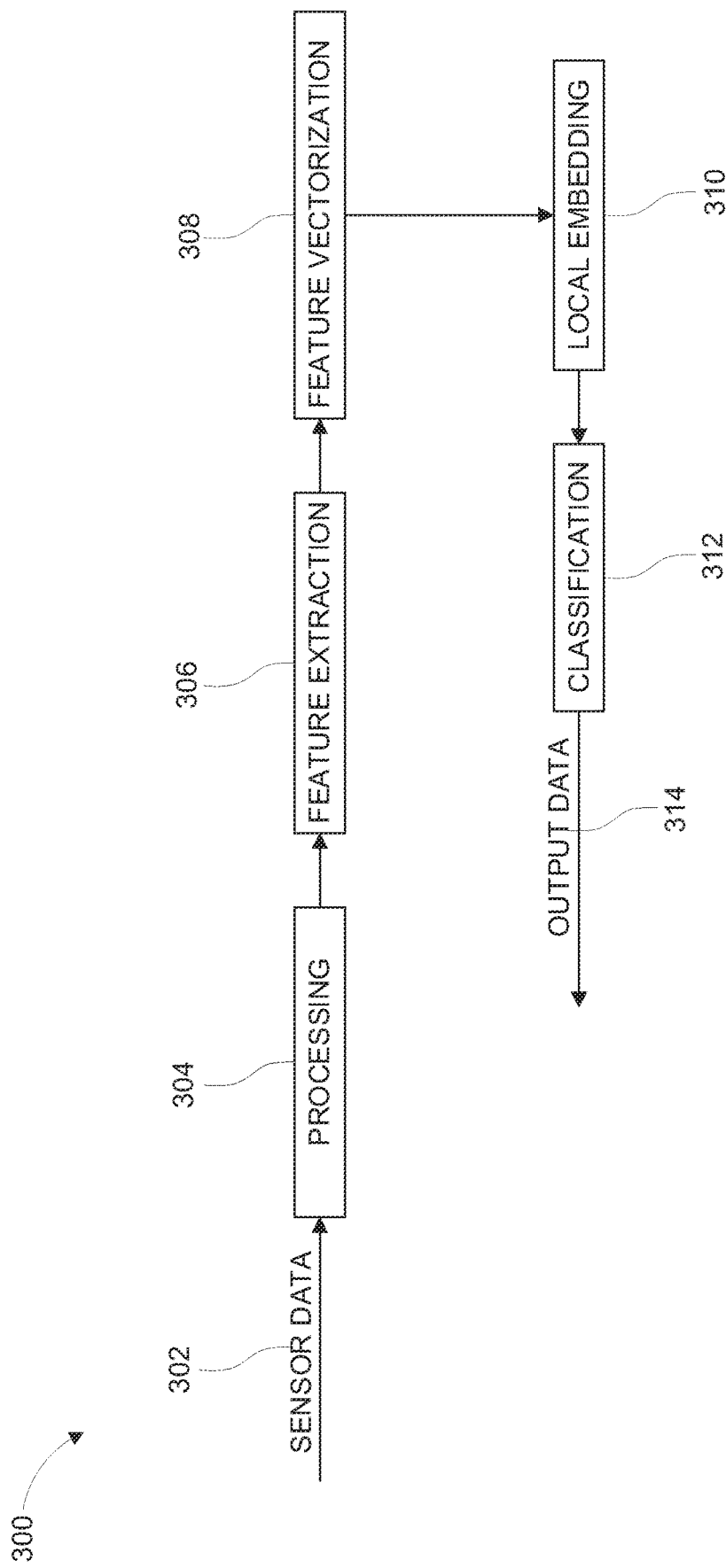
Figure 4:
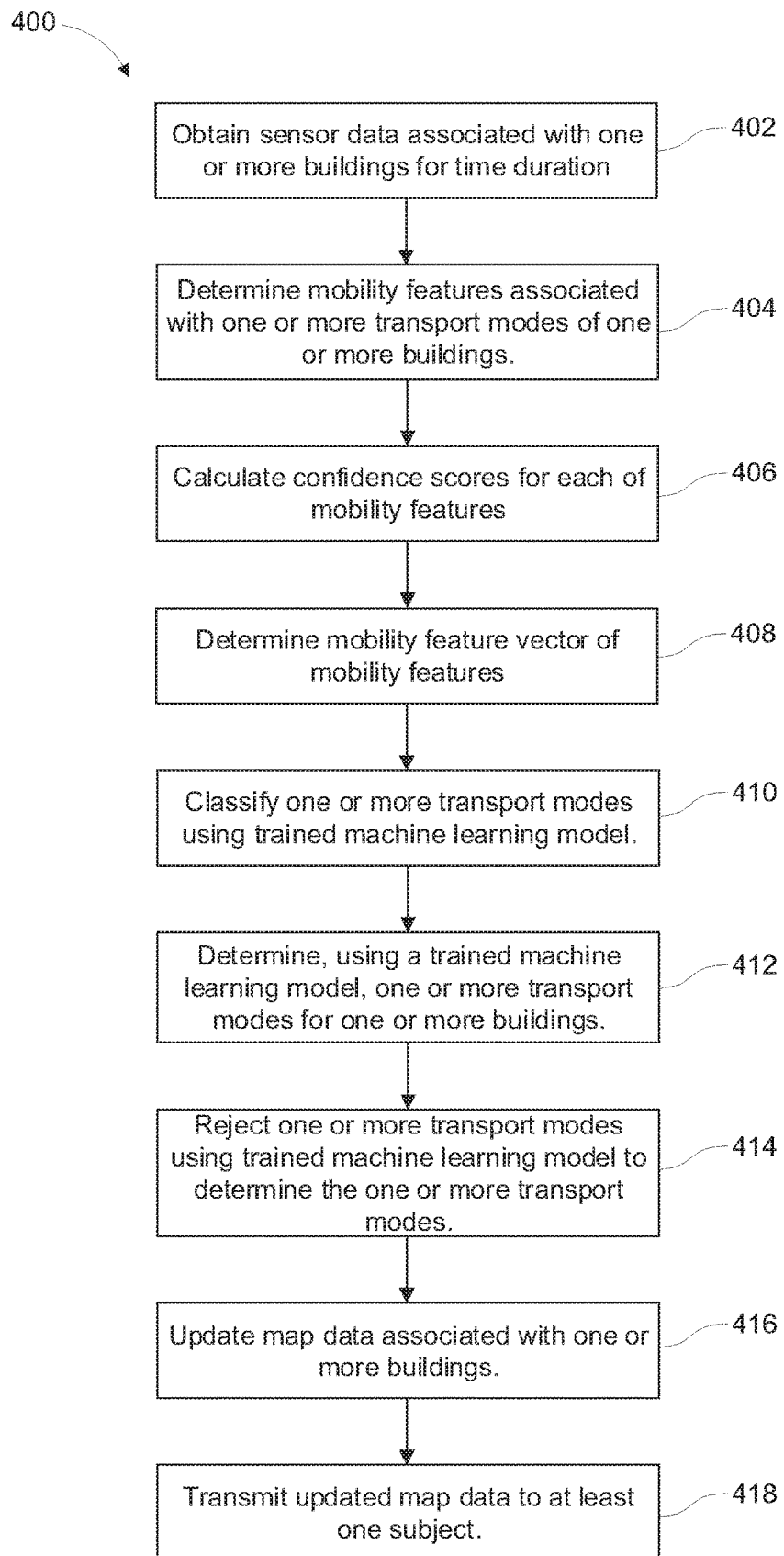
Figure 5:
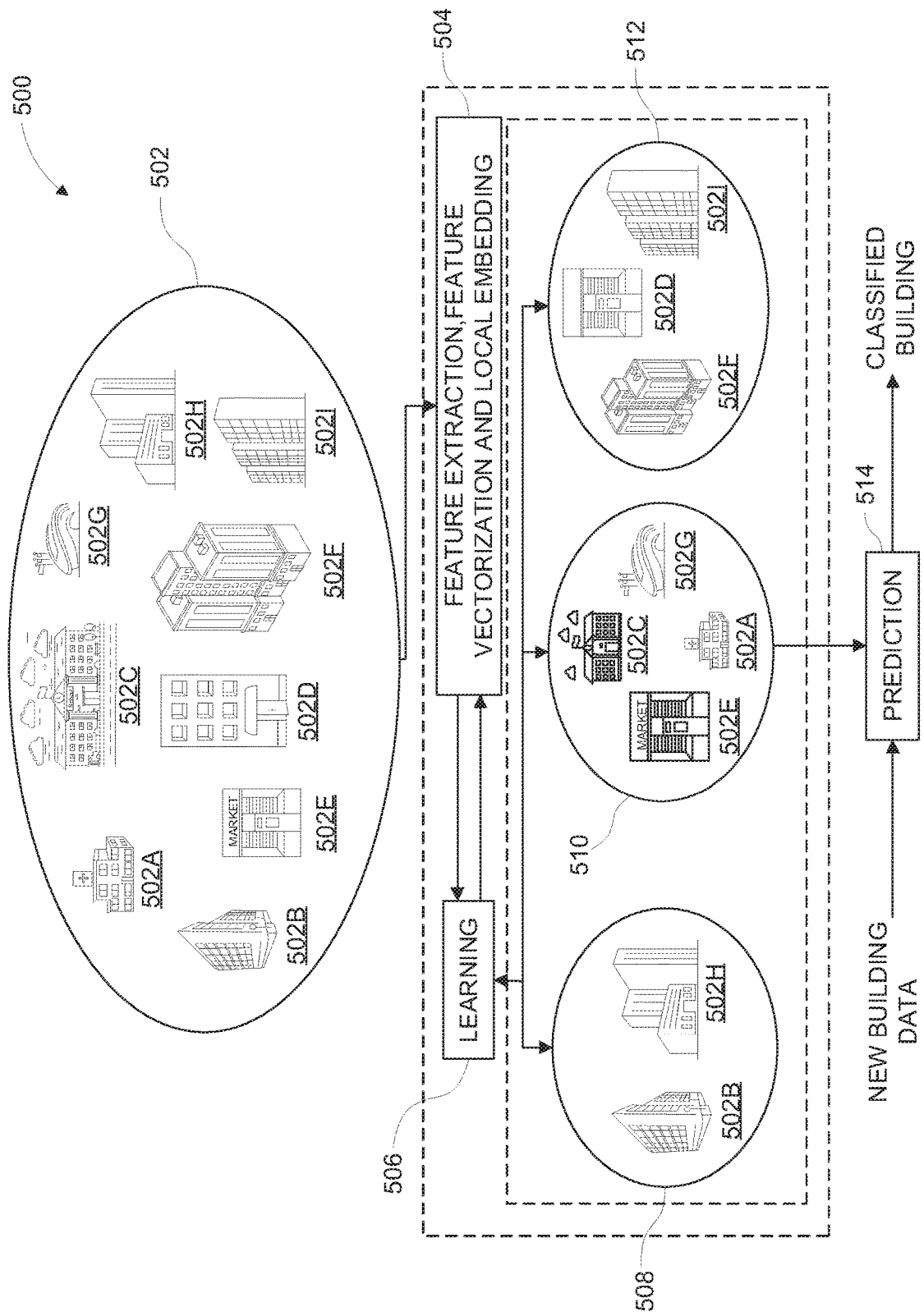
Figure 6:
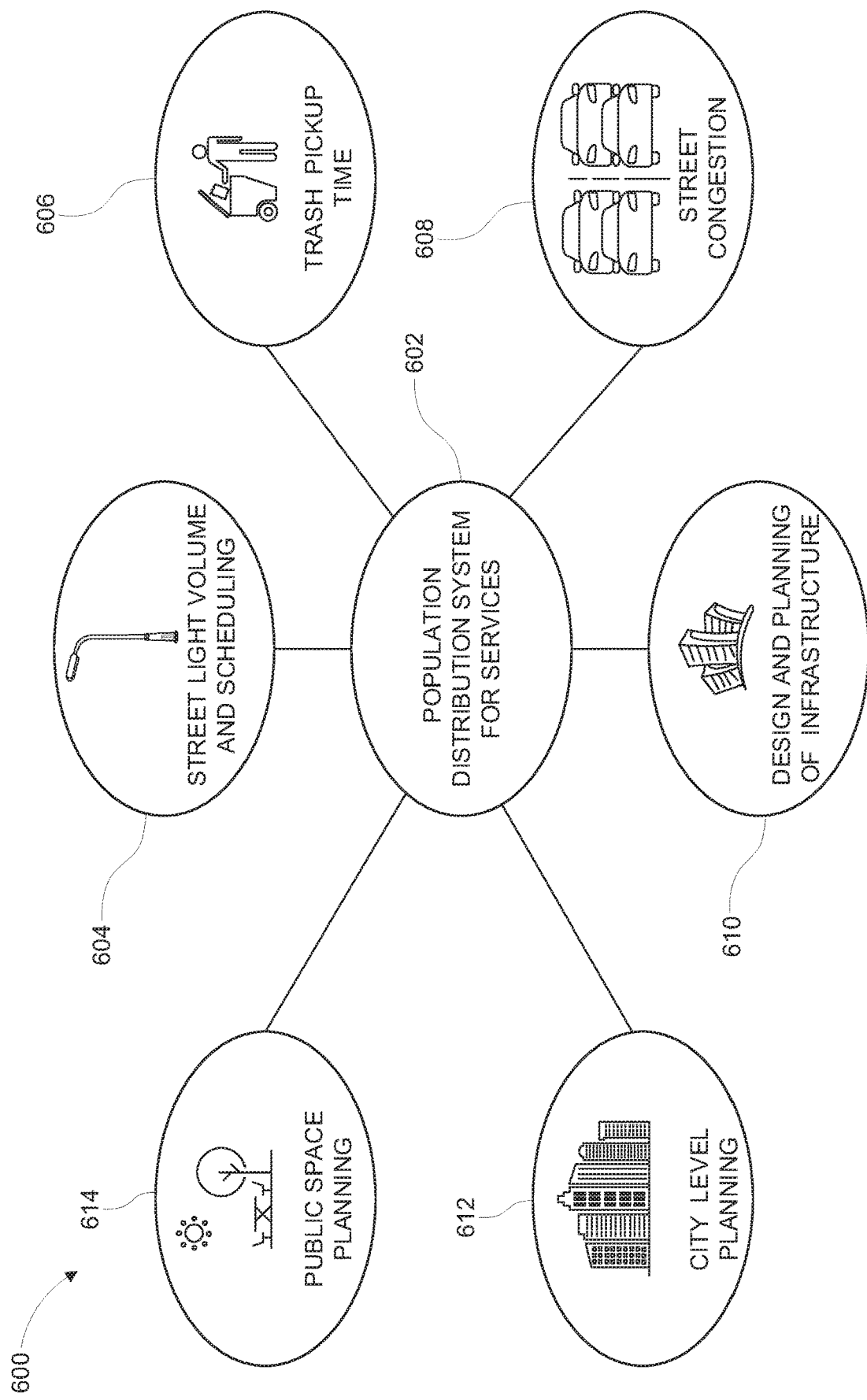
Figure 7A:
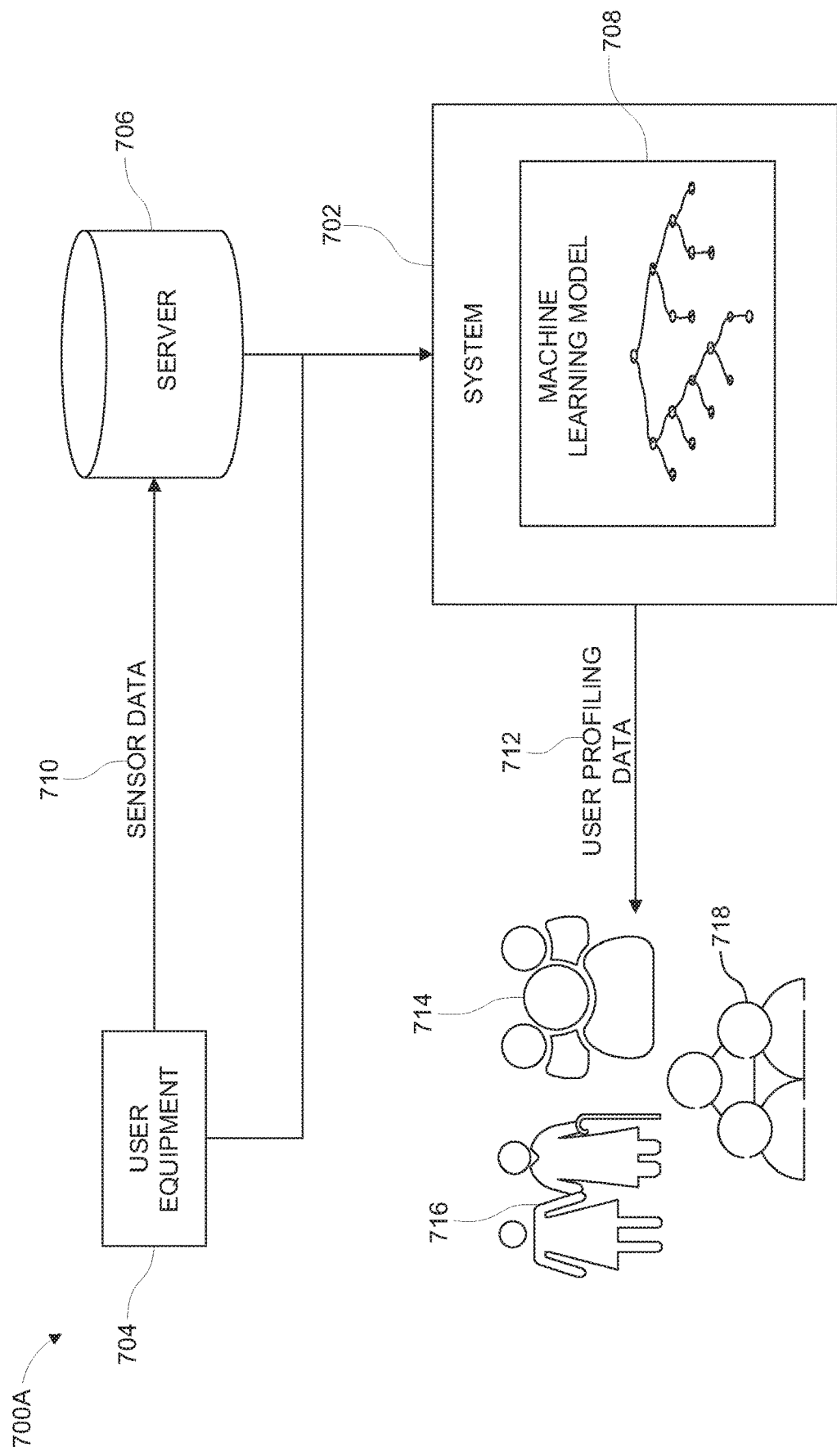
Figure 8A:
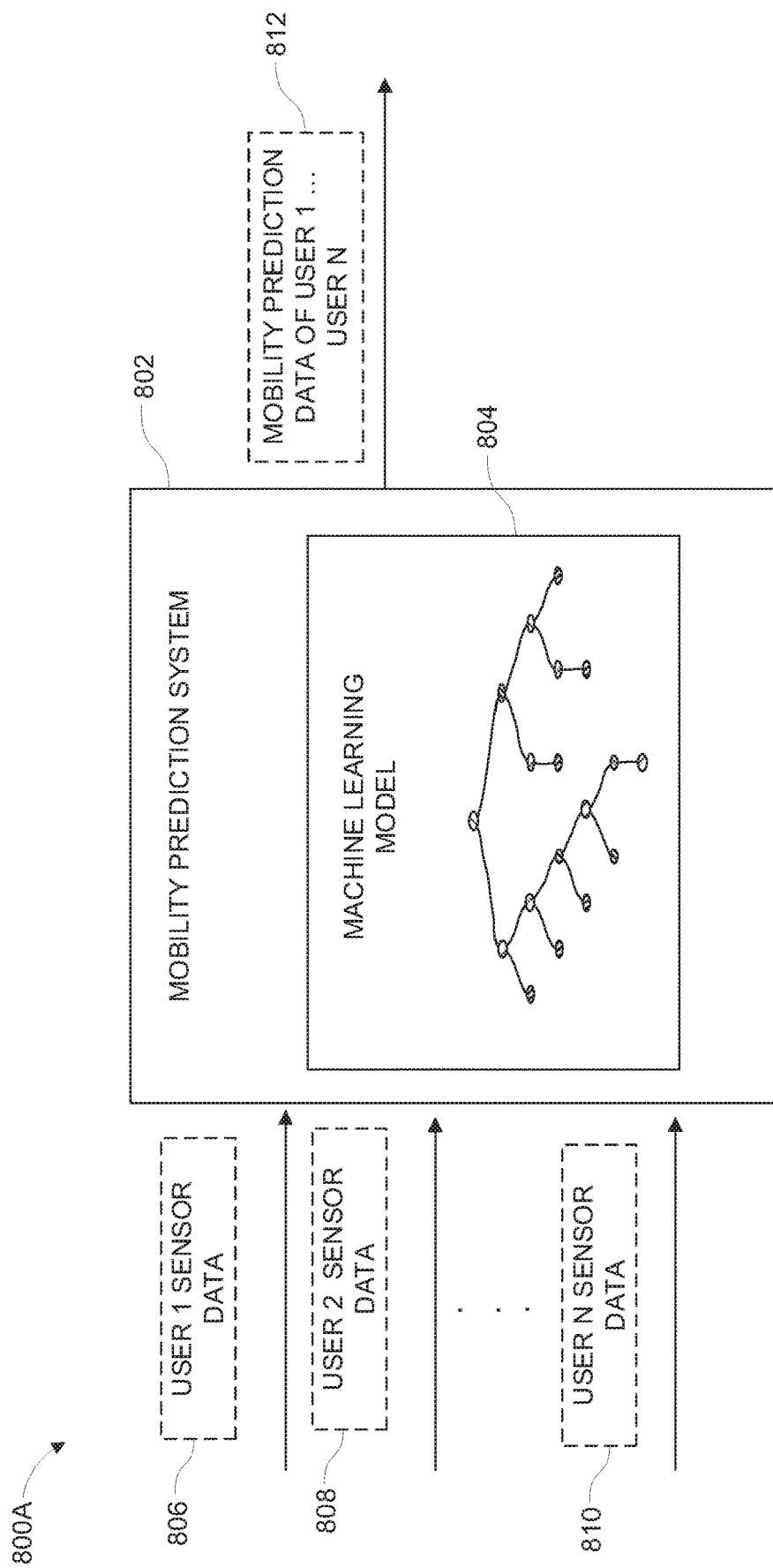
Figure 8B:
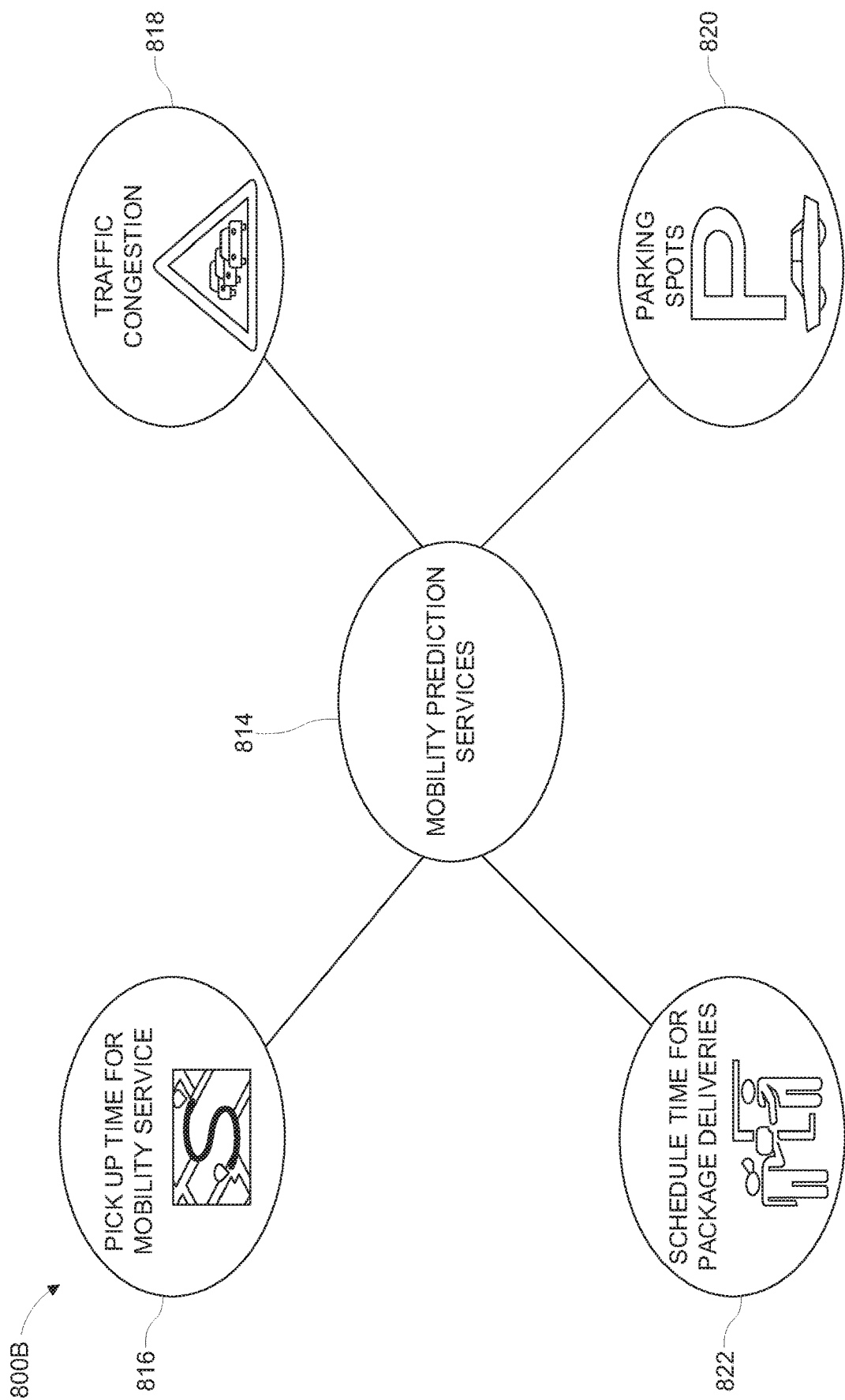
Figure 9:
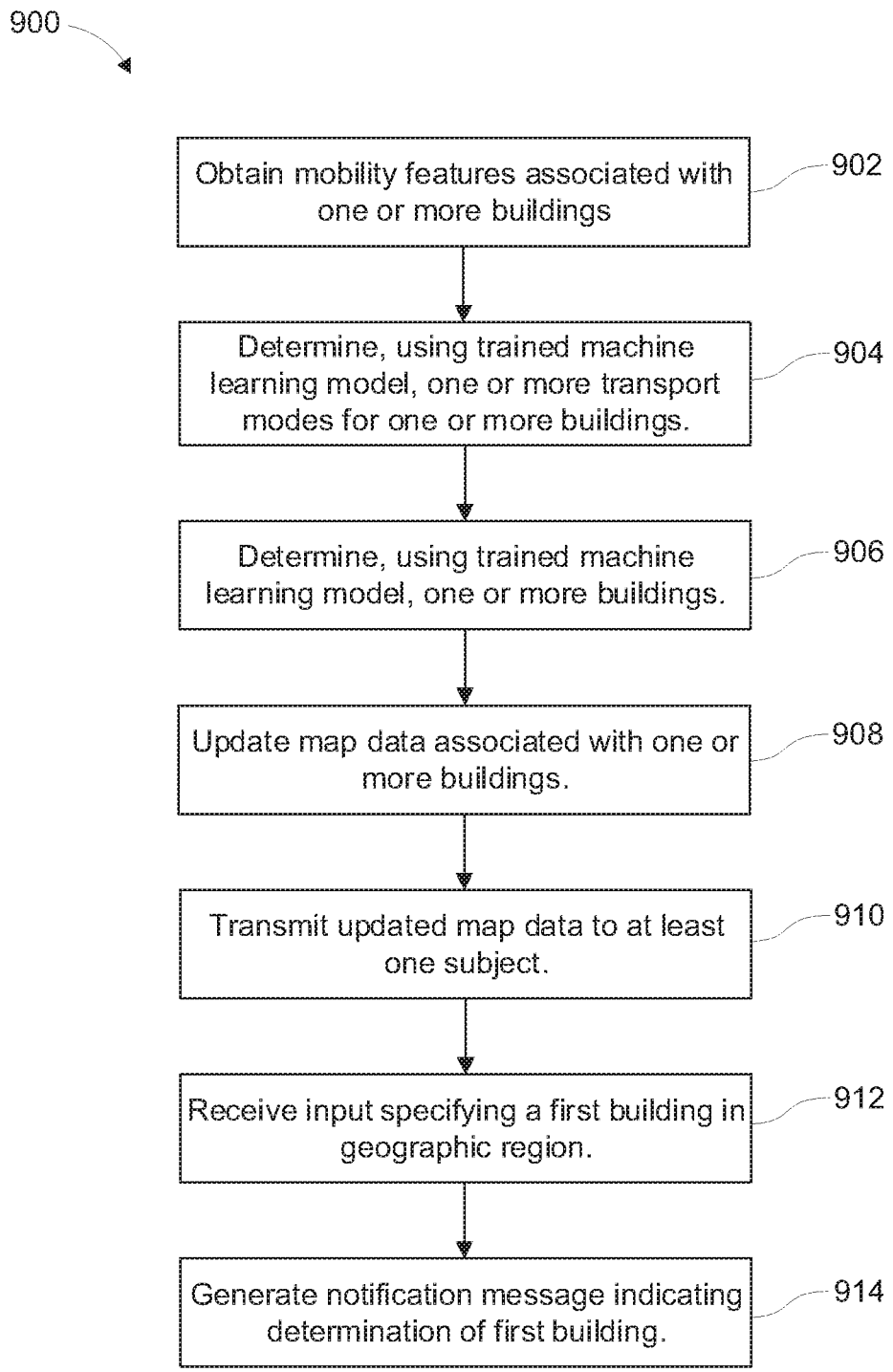
Figure 10:
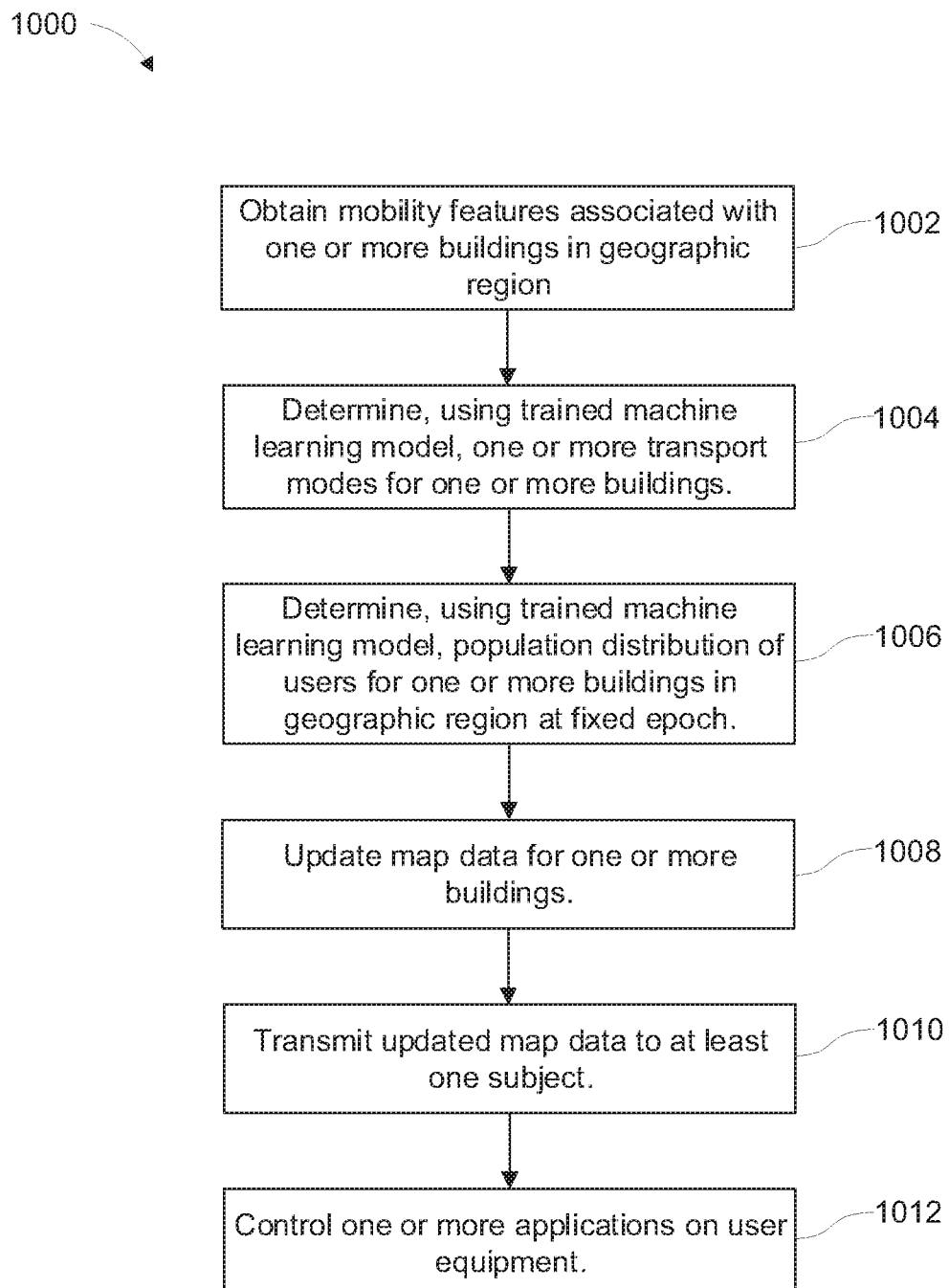
Figure 11:
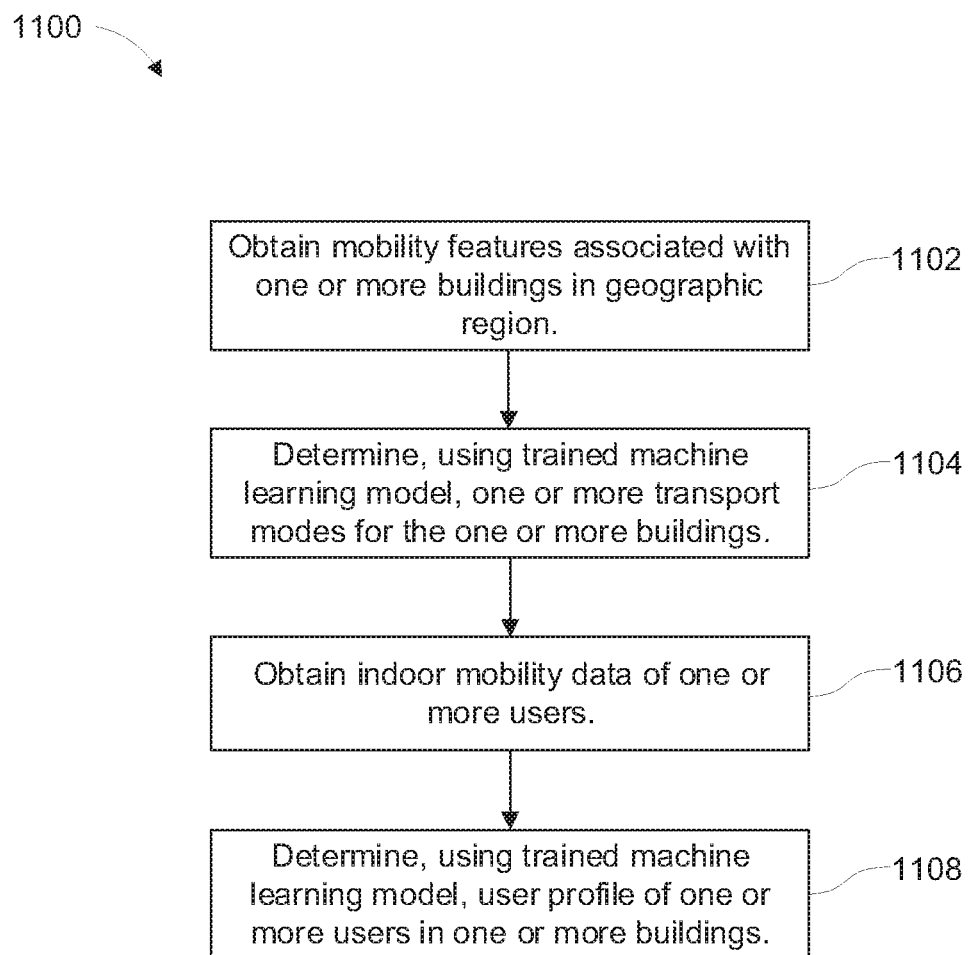
Figure 12:
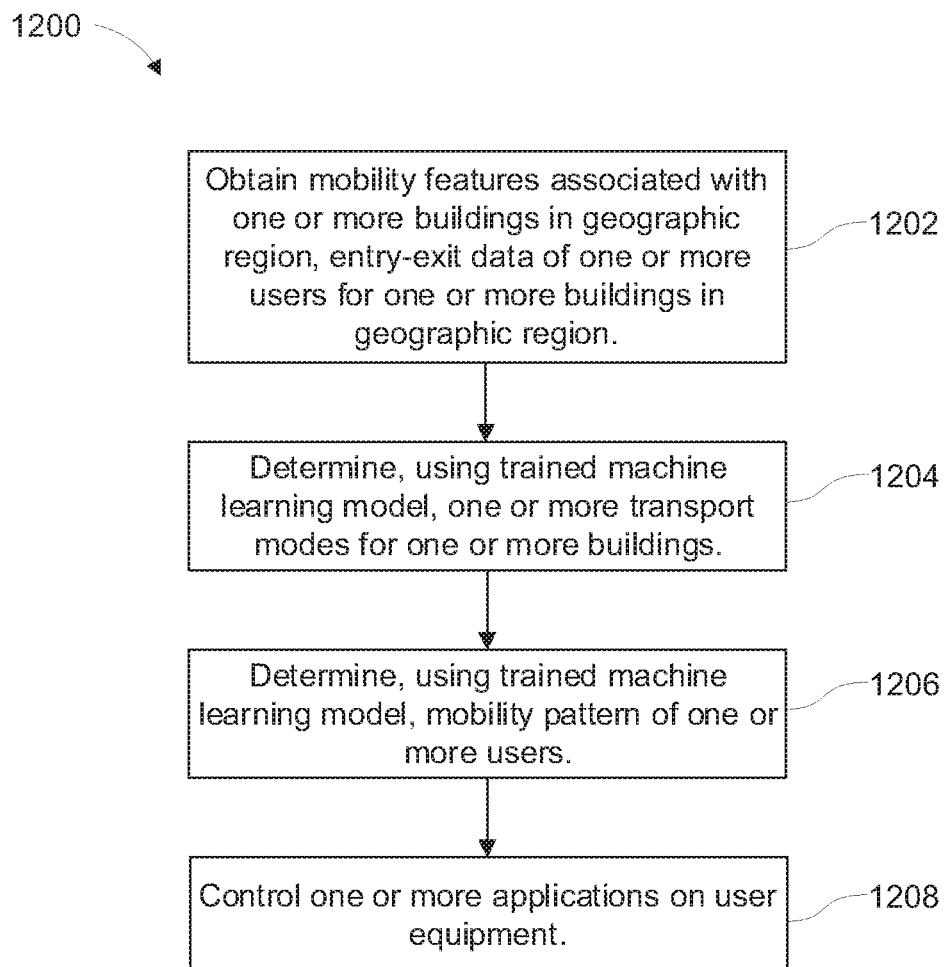

Having thus described example embodiments of the invention in general terms, reference will now be made to the accompanying drawings, which are not necessarily drawn to scale, and wherein:

FIG. 1 illustrates a schematic diagram of a network environment of a system for determining one or more transport modes for one or more buildings in a geographic region, in accordance with an example embodiment;

FIG. 2 illustrates a block diagram of the system, as illustrated in FIG. 1, for determining one or more transport modes for one or more buildings in a geographic region, in accordance with an example embodiment;

FIG. 3 illustrates a block diagram showing high level component functionality of the system, for determining one or more transport modes for one or more buildings in a geographic region, in accordance with an example embodiment;

FIG. 4 illustrates a flowchart for implementation of an exemplary method for determining one or more transport modes for one or more buildings in a geographic region, in accordance with an embodiment;

FIG. 5 illustrates a schematic diagram of a system for determining one or more buildings in a geographic region, in accordance with an embodiment;

FIG. 6 illustrates a schematic diagram of a system for determining population distribution of users for one or more buildings in a geographic region, in accordance with an embodiment;

FIGS. 7A and 7B, collectively illustrate schematic diagrams of a system for determining user profile of one or more users in one or more buildings in a geographic region, in accordance with an embodiment;

FIGS. 8A and 8B, collectively illustrate schematic diagrams of a system for determining mobility pattern of one or more users for one or more buildings in a geographic region, in accordance with an embodiment;

FIG. 9 illustrates a flowchart for implementation of an exemplary method for determining one or more buildings in a geographic region, in accordance with an example embodiment;

FIG. 10 illustrates a flowchart for implementation of an exemplary method for determining population distribution of users for one or more buildings in a geographic region, in accordance with an example embodiment;

FIG. 11 illustrates a flowchart for implementation of an exemplary method for determining user profile of one or more users in one or more buildings in a geographic region, in accordance with an embodiment; and FIG. 12 illustrates a flowchart for implementation of an exemplary method for determining mobility pattern of one or more users for one or more buildings in a geographic region, in accordance with an embodiment.

DETAILED DESCRIPTION

A system, a method, and a computer program product are provided herein in accordance with an example embodiment for determining one or more transport modes for one or more buildings in a geographic region. In some example embodiments, a method, a system, and a computer program product provided herein may also be used for classifying one or more buildings into different types of buildings. In some example embodiments, a method, a system, and a computer program product provided herein may also be used for determining population distribution of users for one or more buildings in a geographic region. In some example embodiments, a method, a system, and a computer program product provided herein may also be used for determining user profile of one or more users in one or more buildings. In further example embodiments, a method, a system, and a computer program product provided herein may also be used for determining mobility pattern of one or more users for one or more buildings. The systems, the methods, and the computer program products disclosed herein provide utilization of sensors on the mobile devices (such as, mobile phones, tablets or wearable devices) of the users.

From the sensors, mobility patterns may be determined that are unique to each activity. User mobility data from the mobile phones may facilitate data service innovations where mobile services are created based on patterns related to individuals as well as communities. Therefore, embodiments of the present disclosure provide user experiences based on mobility patterns extracted from the sensors on the mobile devices of the users.

In accordance with an embodiment, the system, the method, and the computer program product disclosed herein may further provide a notification message indicating a classification of a building at a certain instance of time. For example, the notification message may inform a vehicle or user equipment about availability of accurate and up-to-date building data for a certain geographic region. Alternatively, the available up-to-date building data may be pushed as an update to the vehicle or user equipment. In this way, a beneficiary of the data (such as, the vehicle) may be provided with highly accurate commute information inside buildings in a geographic area based on the up-to-date data. These and other technical improvements of the present disclosure will become evident from the description provided herein.

In accordance with an embodiment, the system, the method, and the computer program product disclosed herein may further be used with a navigation application which may be integrated with maps (such as street maps, indoor maps or models).

FIG. 1 illustrates a schematic diagram of a network environment 100 of a system in accordance with an example embodiment. The system 102 may be communicatively coupled with, a user equipment (UE) 104 an OEM cloud 106, a mapping platform 108, via a network 110. The mapping platform 108 may further include a server 108A and a database 108B. The user equipment includes an application 104A, a user interface 104B, and a sensor unit 104C. Further, the server 108A and the database 108B may be communicatively coupled to each other.

The system 102 may comprise suitable logic, circuitry, interfaces and code that may be configured to process the sensor data obtained from the UE 104 for activity inference, such as determination of one or more transport modes for one or more buildings in a geographic region. The system 102 may be communicatively coupled to the UE 104, the OEM cloud 106, and the mapping platform 108 directly via the network 110. Additionally, or alternately, in some example embodiments, the system 102 may be communicatively coupled to the UE 104 via the OEM cloud 106 which in turn may be accessible to the system 102 via the network 110.

All the components in the network environment 100 may be coupled directly or indirectly to the network 110. The components described in the network environment 100 may be further broken down into more than one component and/or combined together in any suitable arrangement. Further, one or more components may be rearranged, changed, added, and/or removed. Furthermore, fewer or additional components may be in communication with the system 102, within the scope of this disclosure.

The system 102 may be embodied in one or more of several ways as per the required implementation. For example, the system 102 may be embodied as a cloud based service or a cloud based platform. As such, the system 102 may be configured to operate outside the UE 104. However, in some example embodiments, the system 102 may be embodied within the UE 104. In each of such embodiments, the system 102 may be communicatively coupled to the components shown in FIG. 1 to carry out the desired operations and wherever required modifications may be possible within the scope of the present disclosure.

The UE 104 may be any user accessible device, such as, a mobile phone, a smartphone, a portable computer, a wearable device (such as a fitness band) and the like that is portable in itself or as a part of another portable/mobile object, such as, a vehicle. The UE 104 may comprise a processor, a memory and a network interface. The processor, the memory and the network interface may be communicatively coupled to each other. In some example embodiments, the UE 104 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In such example embodiments, the UE 104 may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the UE 104. Additional, different, or fewer components may be provided. For example, the UE 104 may be configured to execute and run mobile applications such as a messaging application, a browser application, a navigation application, and the like. In accordance with an embodiment, the UE 104 may be directly coupled to the system 102 via the network 110. For example, the UE 104 may be a dedicated vehicle (or a part thereof) for gathering data for development of the map data in the database 108B. In some example embodiments, the UE 104 may be coupled to the system 102 via the OEM cloud 106 and the network 110. For example, the UE 104 may be a consumer mobile phone (or a part thereof) and may be a beneficiary of the services provided by the system 102. In some example embodiments, the UE 104 may serve the dual purpose of a data gatherer and a beneficiary device. The UE 104 may be configured to provide sensor data to the system 102. In accordance with an embodiment, the UE may process the sensor data locally for the activity inference, such as determination of one or more transport modes for one or more buildings in a geographic region. Further, in accordance with an embodiment, the UE 104 may be configured to perform processing related to classification of one or more transport modes for one or more buildings locally.

The UE 104 may include the application 104A with the user interface 104B to access one or more applications. The application 104B may correspond to, but not limited to, map related service application, navigation related service application and location based service application. In other words, the UE 104 may include the application 104A with the user interface 104B.

The sensor unit 104C may be embodied within the UE 104. The sensor unit 104C comprising one or more sensors may capture sensor data, in a certain geographic location. In accordance with an embodiment, the sensor unit 104C may be built-in, or embedded into, or within interior of the UE 104. The one or more sensors (or sensors) of the sensor unit 104C may be configured to provide the sensor data comprising location data associated with a location of a user. In accordance with an embodiment, the sensor unit 104C may be configured to transmit the sensor data to an Original Equipment Manufacturer (OEM) cloud. Examples of the sensors in the sensor unit 104C may include, but not limited to, a microphone, a camera, an acceleration sensor, a gyroscopic sensor, a LIDAR sensor, a proximity sensor, and a motion sensor.

The sensor data may refer to sensor data collected from a sensor unit 104C in the UE 104. In accordance with an embodiment, the sensor data may be collected from a large number of mobile phones. In accordance with an embodiment, the sensor data may refer to the point cloud data. The point cloud data may be a collection of data points defined by a given coordinates system. In a 3D coordinates system, for instance, the point cloud data may define the shape of some real or created physical objects. The point cloud data may be used to create 3D meshes and other models used in 3D modelling for various fields. In a 3D Cartesian coordinates system, a point is identified by three coordinates that, taken together, correlate to a precise point in space relative to a point of origin. The LIDAR point cloud data may include point measurements from real-world objects or photos for a point cloud data that may then be translated to a 3D mesh or NURBS or CAD model. In accordance with an embodiment, the sensor data may be converted to units and ranges compatible with the system 102, to accurately receive the sensor data at the system 102. Additionally, or alternately, the sensor data of a user equipment may correspond to movement data associated with a user of the user equipment. Without limitations, this may include motion data, position data, orientation data with respect to a reference and the like.

The mapping platform 108 may comprise suitable logic, circuitry, interfaces and code that may be configured to store map data associated with layout of one or more buildings. The layout may include position of the one or more transport modes for one or more buildings in a geographic region. The server 108A of the mapping platform 108 may comprise processing means and communication means. For example, the processing means may comprise one or more processors configured to process requests received from the system 102 and/or the UE 104. The processing means may fetch map data from the database 108B and transmit the same to the system 102 and/or the UE 104 in a suitable format. In one or more example embodiments, the mapping platform 108 may periodically communicate with the UE 104 via the processing means to update a local cache of the map data stored on the UE 104. Accordingly, in some example embodiments, map data may also be stored on the UE 104 and may be updated based on periodic communication with the mapping platform 108.

The database 108B of the mapping platform 108 may store map data of one or more geographic regions that may correspond to a city, a province, a country or of the entire world. The database 108B may store point cloud data collected from the UE 104. The database 108B may store data such as, but not limited to, node data, road segment data, link data, point of interest (POI) data, link identification information, and heading value records. The database 108B may also store cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities for identifying location of building.

Optionally, the database 108B may contain path segment and node data records, such as shape points or other data that may represent pedestrian paths, links or areas in addition to or instead of the vehicle road record data. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The database 108B may also store data about the POIs and their respective locations in the POI records. The database 108B may additionally store data about places, such as cities, towns, or other communities, and other geographic features such as bodies of water, and mountain ranges. Such place or feature data can be part of the POI data or can be associated with POIs or POI data records (such as a data point used for displaying or representing a position of a city). In addition, the database 108B may include event data (e.g., traffic incidents, construction activities, scheduled events, unscheduled events, accidents, diversions etc.) associated with the POI data records or other records of the database 108B. Optionally or additionally, the database 108B may store 3D building maps data (3D map model of objects) of structures surrounding roads and streets.

The database 108B may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the UE 104. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

As mentioned above, the database 108B may be a master geographic database, but in alternate embodiments, the database 108B may be embodied as a client-side map database and may represent a compiled navigation database that may be used in or with end user devices (such as the UE 104) to provide navigation and/or map-related functions. In such a case, the database 108B may be downloaded or stored on the end user devices (such as the UE 104).

The network 110 may comprise suitable logic, circuitry, and interfaces that may be configured to provide a plurality of network ports and a plurality of communication channels for transmission and reception of data, such as the sensor data, map data from the database 108B, etc. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 110 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 110 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) networks (for e.g. LTE-Advanced Pro), 5G New Radio networks, ITU-IMT 2020 networks, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

FIG. 2 illustrates a block diagram 200 of the system 102, exemplarily illustrated in FIG. 1, for determining one or more transport modes for one or more buildings in a geographic region, in accordance with an example embodiment. FIG. 2 is described in conjunction with elements from FIG. 1.

As shown in FIG. 2, the system 102 may comprise a processing means such as a processor 202, storage means such as a memory 204, a communication means, such as a network interface 206, an input/output (I/O) interface 208, and a machine learning model 210. The processor 202 may retrieve computer executable instructions that may be stored in the memory 204 for execution of the computer executable instructions. The system 102 may connect to the UE 104 via the I/O interface 208. The processor 202 may be communicatively coupled to the memory 204, the network interface 206, the I/O interface 208, and the machine learning model 210.

The processor 202 may comprise suitable logic, circuitry, and interfaces that may be configured to execute instructions stored in the memory 204. The processor 202 may obtain sensor data associated with the one or more buildings for time duration. The sensor data may be captured by one or more UE, such as the UE 104. The processor 202 may be configured to determine mobility features associated with the one or more buildings, based on the sensor data. The processor 202 may be further configured to determine, using a trained machine learning model, the one or more transport modes for the one or more buildings, based on the mobility features.

Examples of the processor 202 may be an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits. The processor 202 may implement a number of processor technologies known in the art such as a machine learning model, a deep learning model, such as a recurrent neural network (RNN), a convolutional neural network (CNN), and a feed-forward neural network, or a Bayesian model. As such, in some embodiments, the processor 202 may include one or more processing cores configured to perform independently. A multi-core processor may enable multiprocessing within a single physical package.

Additionally or alternatively, the processor 202 may include one or more processors configured in tandem via the bus to enable independent execution of instructions, pipelining and/or multithreading. Additionally or alternatively, the processor 202 may include one or processors capable of processing large volumes of workloads and operations to provide support for big data analysis. However, in some cases, the processor 202 may be a processor specific device (for example, a mobile terminal or a fixed computing device) configured to employ an embodiment of the disclosure by further configuration of the processor 202 by instructions for performing the algorithms and/or operations described herein.

In some embodiments, the processor 202 may be configured to provide Internet-of-Things (IoT) related capabilities to users of the UE 104 disclosed herein. The IoT related capabilities may in turn be used to provide smart city solutions by providing real time parking updates, big data analysis, and sensor based data collection for providing navigation and parking recommendation services. The environment may be accessed using the I/O interface 208 of the system 102 disclosed herein.

The memory 204 may comprise suitable logic, circuitry, and interfaces that may be configured to store a machine code and/or instructions executable by the processor 202. The memory 204 may be configured to store information including processor instructions for training the machine learning model. The memory 204 may be used by the processor 202 to store temporary values during execution of processor instructions. The memory 204 may be configured to store different types of data, such as, but not limited to, sensor data from the UE 104. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may comprise suitable logic, circuitry, and interfaces that may be configured to communicate with the components of the system 102 and other systems and devices in the network environment 100, via the network 110. The network interface 206 may communicate with the UE 104, via the network 110 under the control of the processor 202. In one embodiment, the network interface 206 may be configured to communicate with the sensor unit 104C disclosed in the detailed description of FIG. 1. In an alternative embodiment, the network interface 206 may be configured to receive the sensor data from the OEM cloud 106 over the network 110 as described in FIG. 1. In some example embodiments, the network interface 206 may be configured to receive location information of a user associated with a UE (such as, the UE 104), via the network 110. In accordance with an embodiment, a controller of the UE 104 may receive the sensor data from a positioning system (for example: a GPS based positioning system) of the UE 104. The network interface 206 may be implemented by use of known technologies to support wired or wireless communication of the system 102 with the network 110. Components of the network interface 206 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer circuit.

The I/O interface 208 may comprise suitable logic, circuitry, and interfaces that may be configured to operate as an I/O channel/interface between the UE 104 and different operational components of the system 102 or other devices in the network environment 100. The I/O interface 208 may facilitate an I/O device (for example, an I/O console) to receive an input (e.g., sensor data from the UE 104 for a time duration) and present an output to one or more UE (such as, the UE 104) based on the received input. In accordance with an embodiment, the I/O interface 208 may obtain the sensor data from the OEM cloud 106 to store in the memory 202. The I/O interface 208 may include various input and output ports to connect various I/O devices that may communicate with different operational components of the system 102. In accordance with an embodiment, the I/O interface 208 may be configured to output the one or more transport modes to a user device, such as, the UE 104 of FIG. 1.

In example embodiments, the I/O interface 208 may be configured to provide the data associated with determined one or more transport modes to the database 108A to update the map of a certain geographic region. In accordance with an embodiment, a user requesting information in a geographic region may be updated about the detection and classification of a building. Examples of the input devices may include, but is not limited to, a touch screen, a keyboard, a mouse, a joystick, a microphone, and an image-capture device. Examples of the output devices may include, but is not limited to, a display, a speaker, a haptic output device, or other sensory output devices.

In accordance with an embodiment, the processor 202 may train the machine learning model 210 to determine the one or more transport modes for one or more buildings in a geographic region. In accordance with an embodiment, the machine learning model 210 may be trained offline to obtain a classifier model to determine the one or more transport modes for one or more buildings in a geographic region as a function of mobility features that represent motion dynamics or stationarity associated with one or more transport modes and users commuting on the one or more transport modes. For the training of the machine learning model 210, different feature selection techniques and classification techniques may be used. The system 102 may be configured to obtain the trained machine learning model 210 and determine mobility features from the sensor data obtained from the one or more UE, such as the UE 104 for determination of the one or more transport modes for the one or more buildings in the geographic region.

Datasets comprising the sensor data may be used for building the machine learning model 210 with all transport modes to be determined. For building the machine learning model 210, the sensor data may be obtained for fixed time duration, and a reference transport mode may be assigned in the training data (such as, the sensor data) to learn from. Further, the mobility features that represent motion dynamics or stationarity may be determined, stored and fed to the machine learning model 210 building technique. Further, for building the machine learning model 210, the sensor data may be fed to the model building technique to run it to build and obtain the machine learning model 210. The transport mode may be a target output used to build the machine learning model 210, and the mobility features that represent motion dynamics or stationarity constitute as input to the machine learning model 210 corresponding to the target output. In accordance with an embodiment, the machine learning model building technique may correspond to a classification technique, such as, but not limited to, decision trees and random forest.

In accordance with an embodiment, various data sources may provide the sensor data as an input to the machine learning model 210. In accordance with an embodiment, mobility features may be provided as an input to the machine learning model 210. Examples of the machine learning model 210 may include, but not limited to, Decision Tree (DT), Random Forest, and Ada Boost. In accordance with an embodiment, the memory 204 may include processing instructions for training of the machine learning model 210 with data set that may be real-time (or near real time) data or historical data. In accordance with an embodiment, the data may be obtained from one or more service providers.

FIG. 3 illustrates a block diagram 300 showing a process flow of high level component functionality of the system 102, for determining one or more transport modes for one or more buildings in a geographic region, in accordance with an example embodiment. FIG. 3 is explained in conjunction with FIG. 1 and FIG. 2. There is shown the process flow of the system 102, viz., sensor data 302, pre-processing 304, feature extraction 306, feature vectorization 308, local embedding 310, classification 312 and output data 314 from the system 102.

The processor 202 of the system 102 may be configured to obtain the sensor data 302 associated with the one or more buildings in a geographic region for time duration. The processor 202 of the system 102 may be configured to obtain the sensor data 302 from the sensor unit (such as, the sensor unit 104C) of one or more UE (such as, the UE 104). In accordance with an embodiment, the sensor unit 104C of the UE 104 may include, but not limited to, a gyroscopic sensor, an accelerometer, a magnetometer, and a rotation sensor. The sensor data obtained from the sensor unit 104C may include, but not limited to, motion, position and direction of the one or more transport modes (such as, but not limited to, stairs, elevator, and escalator) associated with the one or more buildings in the geographic region.

In an example embodiment, acceleration data (or sensor data) may be extracted from the accelerometer and orientation data (or sensor data) may be extracted from the gyroscopic sensor. In accordance with an embodiment, the accelerometer of the sensor unit 104C may be configured to measure acceleration in all three axes (i.e. x, y, and z). From the UE 104, the acceleration with gravity and without gravity may be accessed by the system 102 which may facilitate computation of statistical features for mobility features that are unique for a particular activity. Square, and sum of area encompassed by magnitude of the readings on all the three axes (i.e. x, y, and z) may facilitate building of a classification model (such as, the machine learning model 210) to detect or infer current context of a user probabilistically. In accordance with an embodiment, GPS sensor may provide location positioning data to the system 102. The location positioning data may provide latitude, longitude, speed, acceleration, and heading change information to the system 102.

Examples of the accelerometer may include, but not limited to, piezoelectric, charge mode piezoelectric, variable capacitance, microelectromechanical systems (MEMS). Further, the gyroscopic sensor may measure rotational motion or angular velocity. Examples of the gyroscopic sensor may include, but not limited to gyroscope is a microelectromechanical system (MEMS) or Coriolis vibratory gyroscope. In some instances, the gyroscopic sensor may be combined with the accelerometer to measure the sensor data.

The sensor data may be extracted around the different coordinate axes of the one or more buildings in the geographic region. In accordance with an embodiment, the sensor data obtained from sensor units of one or more UE (such as the UE 104) may correspond to raw sensor data that may be unprocessed or minimally processed data. The one or more buildings may include, but not limited to, a residential building, a hospital, an office building, a mall, and a metro station.

In accordance with an embodiment, the UE 104 may transmit the sensor data immediately to the system 102 after capturing the sensor data. In accordance with an alternate embodiment, the UE 104 may transmit the sensor data to the system 102 in batches. In such a case, the system 102 may access one or more UE periodically (similar to the UE 104) for obtaining the sensor data.

The system 102 may use the sensor data obtained from a large number of UE to accurately determine a building type of the one or more buildings in the geographic region. The sensor data obtained from sensors of the UE, such as smartphones have an advantage of being installed on a large class of smart phones, having a low-energy footprint.

At 304, processing of the sensor data may be performed. In accordance with an embodiment, the sensor data obtained from sensor units of one or more UE (such as the UE 104) may correspond to raw sensor data that may be unprocessed or minimally processed data. Therefore, the system 102 may be configured to process the sensor data. The processing of the sensor data may include, but not limited to, fusing and de-noising of the sensor data. In some example embodiments, the system 102 may receive processed sensor data from one or more sources and in such scenarios, step 304 may be skipped.

At 306, the system 102 may be configured to extract a plurality of mobility features (hereinafter referred as mobility features) from the processed sensor data. The system 102 may be configured to extract the mobility features so that traveling patterns associated with the one or more transport modes may be determined in sensor traces from the sensor data obtained from the one or more UE (such as, the UE 104). The one or more transport modes may correspond to modes of commute inside the one or more buildings and may include, but not limited to, stairs, elevators and escalators. Different mobility features may be used to detect a same class (of transport modes) accurately. The feature extraction of mobility features is a step needed to extract properties of the sensor data which may help in discrimination of different transport modes from the one or more transport modes. Further, the feature extraction may aid in representing each sample by a feature vector which is discussed in step 308.

The mobility features that may be useful for classification of the one or more transport modes may be created for training the machine learning model 210 during training or learning phase of the machine learning model 210. The machine learning model 210 may include base-level models, such as, but not limited to, Decision Trees and more advanced complex meta-level classification models, such as Voting and Stacking. The mobility features may correspond to one or more attributes of the one or more transport modes in the one or more buildings. The one or more attributes may comprise one or more of vertical mobility signals and transport mode usage at predefined epoch. For example, while a user uses the one or more transport modes, such as, stairs, elevators and escalators, the sensor data obtained from UE of the user (such as, the UE 104) may have strong vertical mobility signals as compared to walking or driving in a vehicle. The transport mode usage may correspond to number of times the one or more transport modes are used. For example, fraction of daily usage of the one or more transport modes by the user may be miniscule as compared to walking, driving, and standing-still.

The one or more attributes may further comprise mean of acceleration, standard deviation of acceleration, yx ratio of acceleration, high peak and low peak of acceleration, correlation of acceleration, and Signal Magnitude Area (SMA) of acceleration.

The mean of acceleration may correspond to mean acceleration in x, y, and z axis that may vary across the one or more transport modes. For example, for elevators, vertical accelerometer reading should be prevalent since elevators travel vertically. Apart from the mean in the individual axis (i.e. x, y, and z), the mean across the three axes may also be used as a mobility feature. The mean of acceleration may correspond to statistical feature of the mobility features. The three axes may correspond to axes in a 3D space.

The standard deviation of acceleration may correspond to the standard deviation in the x, y, and z axis that may be used to capture the fact that the range of possible acceleration values differ between one or more transport mode activities. The standard deviation of acceleration may correspond to statistical feature of the mobility features.

The yx ratio of acceleration may correspond to acceleration in the y axis that may help to identify the one or more transport mode activities that have vertical movement components such as riding elevators, escalators or climbing/descending stairs. However, the yx ratio may be different for all transport modes. For example, even though elevators have y axis acceleration, they may have limited x axis acceleration. Likewise, escalators have y axis acceleration and also x axis acceleration. The yx ratio of acceleration may correspond to statistical feature of the mobility features.

The high peak and low peaks of acceleration may correspond to high and low peak acceleration in the x, y, and z axes from a set of the sensor data from an accelerometer. Unlike the mean acceleration, the high and low peak acceleration for a set of the sensor data may detect sudden brisk movements. More specifically, stair climbing activity may produce higher y axis acceleration peak values than elevator or escalator.

The correlation of acceleration may correspond to correlation measures for dependency between two variables. In accordance with an embodiment, the correlation may be calculated between each pair of accelerometer axis (i.e. xy, xz, and yz) as a ratio of covariance and the product of the standard deviations. Climbing stairs may be translated in multiple dimensions. In accordance with an example embodiment, the corr (y, z) which corresponds to correlation between the y and z axes, for stairs and walk, the corr (y, z) may have low values since the standard deviation for acceleration in the y and z axes is high. On the other hand, elevators have high corr (y, z) since it has smaller deviations and more profound vertical movements.

The SMA of acceleration may be used on user activity recognition to distinguish between resting states and other user activities. For the SMA, the sum of the area encompassed by all three signals may be used to compute the energy expenditure. Since the SMA may be equal to the sum of the area encompassed by the three axes, the one or more transport mode activities, such as walking, may have higher SMA than being stationary.

The system 102 may be configured to determine the transport mode that is being used from the one or more transport modes after obtaining the sensor data because the system 102 may be configured to use the sensor data to infer the presence of a stair, an elevator or an escalator at a location, or to automatically determine whether users use the elevators, the escalators, or the stairs. For example, for the elevators, the dominant vertical movement makes it easily distinguishable from climbing the stairs and riding the escalator. Further, for stairs, the peaks from the accelerometer (from the sensor unit 104C), among other mobility features may make it distinguishable. Furthermore, the elevator may be unique in the sense that the vertical movements of the elevator may be predominant. Also, the vibrations of the elevator as it stops and proceeds at each floor may be distinctive. In the case of accelerometer signals of the escalator and the stairs, such vertical movements and the vibrations may not be present.

In addition to determining accuracy of determining the one or more transport modes by the system 102, it may further be imperative to know which sensor(s) (such as, gyroscope or accelerometer) from the sensor unit (such as, the sensor unit 104C) may be more important for determination of the one or more transport modes. Therefore, to determine the most effective sensor used, feature selection schemes may be used to rank the mobility features used for determination of the one or more transport modes. Feature selection (from the mobility features) may be a data-mining concept which chooses the subset of input features (from the mobility features) by eliminating classification features (or the mobility features) that are less predictive. The system 102 may be configured to calculate confidence scores for each of the mobility features. The confidence scores may correspond to a rank of each of the mobility features. An order of the rank may start with a top ranked mobility feature that corresponds to a most informative mobility feature. In accordance with an embodiment, for feature selection, Information Gain feature selection algorithm may be used. In accordance with an example embodiment, the Information Gain ranking algorithm provides evidence that the accelerometer is more effective than the gyroscope for the determination of the one or more transport modes, since the accelerometer classification features (or mobility features) are more effective than the gyroscope classification features.

In accordance with an embodiment, for inference to determine the one or more transportation mode, the same mobility features utilized/created in training the machine learning model 210 may be extracted by the system 102. Subsequently, given these mobility features, the system 102 with already trained machine learning model 210 may be configured to predict the one or more transport modes of a user probabilistically.

For training the machine learning model 210, traces on different modes of transportation (such as, walking, stationary, stairs, elevator, and escalator) may be collected by the system 102. One limitation may be the size of dataset considered. Realistically, more sensor data (such as, from the accelerometer) may be obtained in an uncontrolled manner from a plurality of users to effectively study and validate the machine learning model 210. In accordance with an embodiment, the dataset considered may facilitate classification of the one or more transport modes; however with more sensor data that includes noise, the accuracy of classification may be reduced which may affect the determination of the one or more transport modes. Therefore, feature vectorization may be used to reduce the size of the dataset. Further, the system 102 may be configured to use a selective learning machine learning model combined with local learning techniques.

At 308, the system 102 may be configured to perform feature vectorization on extracted mobility features to determine feature vector using the machine learning model 210. In machine learning, the feature vector may correspond to an n-dimensional vector of numerical features (mobility features with confidence scores) that represent some object. In other words, a group of features or values representing the sample may correspond to the feature vector. The numerical representation of objects or samples may facilitate processing and statistical analysis.

In accordance with an embodiment, training data of the machine learning model 210 may comprise input-target vector pairs, which is only a finite sample describing input space. The machine learning model 210 may be configured to find a good approximation to a function that relates input vectors to corresponding target vectors, not only for training space, but for entire input space. That is, the trained machine learning model 210 may generalize well which may be achieved by iteratively adjusting weights.

Feature selection criteria may be generated during the training phase of the machine learning model 210. In feature selection, the most suitable subset of mobility features may be selected by the system 102, using the machine learning model 210. The machine learning model 210 may correspond to a selective learning machine learning model. The selective learning machine learning model (or the machine learning model 210) may use an active learning strategy that effectively "prunes" original training set (or the dataset) during training. In accordance with an embodiment, a Neural Network of the machine learning model may use its current learned knowledge to select at each selection interval a subset of informative patterns from candidate dataset. Only the most informative patterns, which are those patterns closest to decision boundaries, are selected for training to show a significant reduction in the training dataset size. Selected patterns are not removed from the candidate set. At each selection interval, all candidate patterns have a chance to be selected. For example, decision tree algorithm may include a windowing strategy to perform pattern selection in cases of extremely large datasets.

At 310, the system 102 may be configured to perform local embedding on the feature vectors, using the machine learning model 210. A local embedding may correspond to a relatively low-dimensional space into which high-dimensional vectors may be translated. The local embedding makes it easier to do machine learning on large inputs like the sensor data. An embedding can be learned and reused across models (such as, the machine learning model 210). The local embedding may be useful because the local embedding may reduce dimensionality of categorical variables (of the mobility features) and meaningfully represent categories in a transformed space by using feature transformation. The feature transformation may obtain a mathematical transformation of the feature vectors to create a new feature vector which is better and more representable of the transport modes. The feature transformation may be generated during the training phase of the machine learning model 210.

At 312, the system 102 may be configured to perform classification on the transformed feature vectors. Classification may correspond to a process of determining the transport mode during a certain period given the feature values. In classification, the feature vector is fed into a trained machine learning model 210 (or previously generated machine learning model) whose output is one of the classes. The classes may correspond to a list of transport modes. The generation of the machine learning model 210 may use any machine learning technique or any classification technique.

In accordance with an embodiment, the system 102 may use classification with a rejection option that consists of simultaneously learning two functions, that is, a classifier along with a rejection function. The rejection function may be confidence-based rejection based on the confidence scores. In accordance with an embodiment, different data mining algorithms may be used for classification, such as, but not limited to, base-level and meta-level classifiers.

The selective learning machine learning model may help to classify the one or more transport modes where a pattern may be identified as being classified correctly or not. When the machine learning model 210 may be already sure of classification of a pattern, there is no need to re-learn that pattern. However, during the learning process, the machine learning model 210 may become uncertain about a previously correct classification, in which case the corresponding pattern should be brought back into the training subset. A selective learning algorithm should therefore have a good understanding of what information must be used for training, and what information can be overlooked. A pattern that has a negligible effect on the output may be considered as uninformative for learning purposes, while informative patterns have a strong influence on the output. The machine learning model 210 may construct optimal decision boundaries over input space. Patterns closest to decision boundaries are the most informative. Selecting the most informative patterns, therefore, results in training only on patterns close to boundaries.

At 314, the system 102 may be configured to determine the one or more transport modes as the output data. The machine learning model 210 may determine the most likely transport mode which has been used by a user of the UE 104 in a previous window. The machine learning model 210 may also output the probability of each transport mode. Further, the system 102 may be configured to reject a pattern whenever the classification may not be achieved with enough confidence. Rejection means not taking any decision. This is useful because in certain classification cases, cost of rejection may be much lower than the misclassification cost. The classification with reject option may comprise to train the machine learning model 210 that rejects the one or more transport modes when confidence in its prediction is low so as to improve the accuracy of the non-rejected examples and reliability of determination (or prediction) of one or more transport modes in the geographic region.

FIG. 4 illustrates a flowchart 400 for implementation of an exemplary method for determining one or more transport modes for one or more buildings in a geographic region, in accordance with an embodiment. FIG. 4 is explained in conjunction with FIG. 1 to FIG. 3. The control starts at 402.

At 402, sensor data associated with the one or more buildings may be obtained for time duration. The processor 202 may be configured to obtain sensor data associated with the one or more buildings for time duration. The sensor data may be obtained from one or more user equipment (UE). In accordance with an embodiment, the UE may correspond to a mobile phone or an electronic device associated with the user.

At 404, mobility features associated with the one or more buildings may be determined. The processor 202 may be configured to determine mobility features associated with the one or more buildings, based on the sensor data. The mobility features may correspond to one or more attributes of the one or more transport modes in the one or more buildings. The one or more attributes may comprise one or more of vertical mobility signals and transport mode usage at predefined epoch.

At 406, confidence scores for each of the mobility features may be calculated. The processor 202 may be further configured to calculate confidence scores for each of the mobility features. The rank for each mobility feature may indicate a measure of relevance/importance of information imparted by the respective mobility feature in determination of the one or more transport modes. The confidence scores may correspond to a rank of each of the mobility features. An order of the rank starts with a top ranked mobility feature that corresponds to a most informative mobility feature.

At 408, mobility feature vector of the mobility features may be determined. The processor 202 may be further configured to determine mobility feature vector of the mobility features based on the trained machine learning model 210. The mobility feature vector may correspond to a numerical representation of the one or more transport modes.

At 410, the one or more transport modes may be classified using the trained machine learning model 210. The processor 202 may be further configured to classify the one or more transport modes using the trained machine learning model 210, based on the mobility feature vector.

At 412, using a trained machine learning model 210, the one or more transport modes for the one or more buildings may be determined. The processor 202 may be configured to determine, using the trained machine learning model, the one or more transport modes for the one or more buildings, based on the one or more mobility features. The one or more transport modes may comprise at least one of a stair, an elevator, an escalator or none. The machine learning model 210 may correspond to a selective-learning machine learning model.

At 414, the one or more transport modes may be rejected using the trained machine learning model 210. The processor 202 may be configured to reject the one or more transport modes using the trained machine learning model for determination of the one or more transport modes, based on a difference of subsequent confidence scores of the mobility features being less than a threshold value. In accordance with an embodiment, rejection may be performed by a rejection function, using the trained machine learning model (or rejection model), that is being learned from training data. An example of the rejection model is a threshold-based model that is based on geometrical distance from training data centroids.

At 416, map data associated with the one or more buildings may be updated. The processor 202 may be configured to update the map data associated with the one or more buildings based on the determined one or more transport modes.

At 418, the updated map data may be transmitted to at least one subject. The processor 202 may be configured to transmit the updated map data to at least one subject. The subject may comprise at least one of a vehicle or user equipment. The control passes to the end.

Accordingly, blocks of the flowchart 400 support combinations of means for performing the specified functions and combinations of operations for performing the specified functions for performing the specified functions. It will also be understood that one or more blocks of the flowchart 400, and combinations of blocks in the flowchart 400, can be implemented by special purpose hardware-based computer systems which perform the specified functions, or combinations of special purpose hardware and computer instructions.

Alternatively, the system may comprise means for performing each of the operations described above. In this regard, according to an example embodiment, examples of means for performing operations may comprise, for example, the processor 202 and/or a device or circuit for executing instructions or executing an algorithm for processing information as described above.

On implementing the method 400 disclosed herein, the end result generated by the system 102 is a tangible determination of one or more transport modes. The determination of one or more transport modes is of utmost importance as only highly accurate output data from the determined one or more transport modes may be further used in the transport modes such as, but not limited to, planning commute modes for a building, raising an alarm in case of over utilization of a particular transport mode over other transport modes, planning multi-modal transport routes for users (nowadays, many buildings have self-balancing scooters or hoverboards and a user coming to a mall may be informed if such a mode of commute is available for a building), differently abled people (such as those using wheel chair) may be informed if there is a wheelchair accessible area in the building or can they take their wheelchairs inside (for example, if there are only escalators and stairs in a building, they may not be able to use wheelchairs).

Although the aforesaid description of FIGS. 1-4 is provided with reference to the sensor data, however, it may be understood that the invention would work in a similar manner for different types and sets of data as well. The system 102 may generate/train the machine learning model 210 to evaluate different sets of data at various geographic locations. Additionally or optionally, the determined one or more transport modes in the form of output data may be provided to an end user, as an update which may be downloaded from the mapping platform 110. The update may be provided as a run time update or a pushed update.

FIG. 5 illustrates a schematic diagram 500 in an exemplary scenario for using a system for determining a building type of one or more buildings in a geographic region, in accordance with an embodiment. FIG. 5 is explained in conjunction with FIG. 1 to FIG. 4. Determination of the building type of the one or more buildings corresponds to classification of the one or more buildings into one or more types of buildings. There is shown a dataset 502 associated with different types of buildings, feature extraction, feature vectorization and local embedding 504 performed by the system for determining one or more buildings in a geographic region, learning 506 associated with a machine learning model, classification of buildings into different types 508, 510, 512, prediction 514 associated with trained machine learning model which outputs a classified building when new building data is fed to the trained machine learning model.

In accordance with an embodiment, a user equipment such as a mobile phone may be configured with multiple sensors, such as a gyroscopic sensor and an accelerometer. The sensor data may comprise a fixed set of attributes and corresponding values obtained from UE, (such as the mobile phone). In accordance with an embodiment, initially data labeling of the sensor data may be done by a user of the mobile phone where the user may annotate the one or more transport modes that are used by the user during a trip of the user in the one or more buildings and the sensor data. Further, the system may be configured to obtain labeled sensor data to determine mobility features. In accordance with an embodiment, at discrete time points, the system may be configured to obtain the sensor data from the mobile phone. For another example, from the accelerometer sensor, the correlations in accelerations in the x, y, and z planes are used as mobility features. With these classification features (or mobility features), a machine learning model may be trained with the labeled sensor data.

The system for determining the building type of one or more buildings may be configured to obtain the mobility features associated with the one or more buildings. The mobility features may be obtained from sensor data of one or more UE. In an example embodiment, the sensor data may be collected automatically by a tracked mobile device (UE) (e.g. a person with a mobile phone or a robot) traversing through a building. Using platform of the mobile device for determining building type of the one or more buildings makes the system convenient because a user has no need to carry additional hardware. In accordance with an embodiment, the system may be communicatively coupled to the UE (or the mobile device). In accordance with another embodiment, the system may be a part of the UE.

In accordance with an embodiment, the mobility features may be obtained from sensor data of the one or more buildings for a fixed epoch. The mobility features may correspond to one or more attributes of the one or more buildings. The one or more attributes may comprise one or more of a number of floors, a usability of the one or more transport modes, a speed of the one or more transport modes, a number of the one or more transport modes, or a volume of the one or more transport modes.

The system may be configured to extract mobility features. The system may be configured to extract the mobility features so that traveling patterns associated with the one or more transport modes may be determined in sensor traces from the sensor data obtained from one or more UE (such as, the UE 104) based on which classification of buildings may be done. Different mobility features may be used to detect a same class (such as, but not limited to, a residential building, a commercial building, a single-storey building or multi-storey building) accurately. The feature extraction is the step needed to extract properties of the sensor data which may help in discrimination of different transport modes from the one or more transport modes and based on which class of buildings may be determined.

In an example embodiment, features that are extracted from the sensor data may be associated with an elevator (one of the transport modes). Such features may be associated with vertical direction as there is no horizontal movement of the elevator. Similarly, features of an escalator may be associated with both horizontal and vertical direction.

The extracted features from the sensor data may be used to generate/train a machine learning model as one or more tracked UE (such as, the mobile phone) traverse a building. The system may be configured to determine, using the trained machine learning model, one or more transport modes for the one or more buildings, based on the mobility features. The one or more transport modes may include, but not limited to, a stair, an elevator, and an escalator.

The machine learning model may be trained on the training data 502 (sensor data) associated with different types of buildings, such as hospital 502A, first office building 502B, an educational institute 502C, a first residential building 502D, a mall 502E, a second residential building 502F, a metro station 502G, a second office building 502H and a third residential building 502I. The different types of building may include, but not limited to, a mall, a residential area, an educational institute, an office building, a hospital, and a metro station.

At 504, feature extraction, feature vectorization and local embedding may be performed by the system using a machine learning model. For inference, to determine the one or more transport modes, the same mobility features utilized in training the machine learning model may be extracted. Subsequently, given these mobility features, the system with already trained machine learning model may be configured to predict the one or more transport modes of a user probabilistically and then determine the one or more buildings into different types of buildings.

Further, the system may be configured to perform feature vectorization on extracted mobility features for a feature vector using the machine learning model. The system may be further configured to perform local embedding on the feature vectors, using the machine learning model. Feature extraction, feature vectorization and local embedding have been explained in detail in description of FIG. 3.

The machine learning model may be in learning phase 506 during the feature extraction, the feature vectorization and the local embedding. The mobility features that may be useful for classification of the one or more transport modes may be created for training the machine learning model during training or learning phase. The machine learning model may include base-level models, such as, but not limited to, Decision Trees and more advanced complex meta-level classification models, such as Voting and Stacking.

The system may be further configured to determine, using the trained machine learning model, building type of the one or more buildings, based on the determined one or more transport modes. Determination of the building type of the one or more buildings corresponds to classification of the one or more buildings into one or more types of buildings. The one or more types of the buildings may comprise a mall, a residential building, an office building, an educational building, and a hospital. For example, in an office building, the frequency to use elevator is higher during morning and evening (i.e. office entering hours and office leaving hours) as compared to the other timings of the day. Similarly, in a residential building, the frequency to use stairs and elevators is equally high, but in most of the residential building, there may be no escalators. Further, in an example embodiment, the mobility features associated with a mall entrance 502e may be based on recognition that the number of floors is less as compared to residential buildings. Furthermore, in an example embodiment, the mobility features may be associated with the usage of escalator and elevator. For example, on weekends, the usage of escalator and elevator is more in mall. Similarly, in an educational institute, users who use stairs are more and availability of elevators and escalators is very rare. Further, the number of floors in a residential building 502I is more as compared to a mall or an educational institute.

Based on the learning 506 by the machine learning model, the system may be configured to classify the mobility features (or the feature vector of the mobility features) using the machine learning model. Further, the system may be configured to classify the training data 502 into different classes of buildings 508, 510, and 512 based on the mobility features.

At 508, the office buildings such as 502H and 502B may classified in a first category. At 510, the buildings such as a mall 502E, hospital 502A, metro station 502G, an educational institute 502C may be classified in a second category. At step 512, the residential buildings such as 502D, 502I and 502F may be considered in a third category. The machine learning model may be trained on the mobility features to classify different types/categories of buildings.

At 514, the new sensor data may be obtained associated with building data by the system to predict the classification of a new building. The system may be configured to extract new mobility features corresponding to the new sensor data for the determination of the one or more buildings. The system may be configured to determine, using the trained machine learning model, the one or more buildings (classified buildings), based on the determined one or more transport modes.

The system may be configured to update map data associated with the one or more buildings based on the classification of the one or more buildings. In accordance with an embodiment, the system may be configured to transmit the updated map data to at least one subject. The subject may comprise at least one of a vehicle or user equipment.

In an example embodiment, a user moving in vehicle from a source location to a destination location may wish to know about a particular building type at a certain geographic region. In such scenarios, the system may predict/determine the type of building using machine learning model based on the trained data in real time.

In an example embodiment, if a user wants to know direction and location of a particular restaurant in a building, the system may provide exact location of the restaurant, such as number of floor on which the restaurant is located. Conventional navigation system may provide information about the distance of the restaurant from current location. However, such navigational system may not provide information about the floor on which the restaurant is present and that information is manually labelled. The system disclosed herein may provide the exact location and floor number of the restaurant.

FIG. 6 illustrates a schematic diagram 600 in an exemplary scenario for using a system for determining population distribution of users associated with one or more buildings in a geographic region, in accordance with an embodiment. FIG. 6 is explained in conjunction with FIG. 1 to FIG. 5. There is shown a population distribution system for services 602, and a plurality of services, viz., street light volume and scheduling 604, trash pickup time 606, street congestion 608, design and planning of infrastructure 610, city level planning 612 and public space planning 614.

The system for determining population distribution of users associated with one or more buildings in a geographic region (hereinafter referred as population distribution system 602) may comprise at least one non-transitory memory configured to store computer executable instructions and at least one processor configured to execute the computer executable instructions.

The population distribution system 602 may be configured to obtain a plurality of mobility features (hereinafter referred as mobility features) associated with the one or more buildings in geographic region. The population distribution system 602 may be configured to determine, using a trained machine learning model, one or more transport modes for one or more buildings. The one or more transport modes may include, but not limited to, stairs, elevators and escalators.

The population distribution system 602 may be configured to determine, using the trained machine learning model, the population distribution of the users associated with the one or more buildings in the geographic region at a fixed epoch based on the determined one or more transport modes. The population distribution system 602 may deal with population into/out of a building, block or neighborhood. A daily distribution of population may be modeled using a trained machine learning model in the population distribution system 602 to optimize corresponding city services or services in a certain geographic region (such as geo-location service).

In an example embodiment, if the population into/out of a building is more during office hours, then the building may be classified as an office building by the population distribution system 602. Further, the population distribution system 602 may be configured to control an application of street light volume and scheduling 604 based on the population distribution in an area of street lighting. The population distribution in an area of street lighting may determine number of street lights in that area, timings to switch on/off the street lights. Similarly, if the building is classified as a residential building, then the area corresponds to residential area and consequently, the street light volume 604 is higher and better. The number of street lights should be higher along all public spaces, especially in areas such as intersections, pedestrian crossings, sidewalks, transit facilities such as bus stops, and narrow streets.

In an example embodiment, services provided in a city by different organizations of the city may be determined by the population distribution system 602 based on the population into/out of a building. For example, an area considered as a residential area may population into/out of a building as compared to other areas and accordingly, the trash pick-up services 606 may be scheduled suitably and provided to the residents of the area. Similarly, if the population into/out of a building is very less than the trash pick-up service 606 may be scheduled suitably, for example, weekly or twice a week.

In an example embodiment, the street congestion 608 and parking congestion is high during office hours near office buildings/areas as population into/out of an official building during office hours is more. The population distribution system 602 may be used to direct users during such office hours to follow routes that are less congested by navigation applications.

In an example embodiment, the population distribution system 602 may be configured to utilize the data associated with population into/out of a building, a block or neighborhood to create resources, such as maps and schedules to direct future design projects for design and planning of infrastructure 610, city level planning 612 and public space planning 614.

In an example embodiment, for design and planning of infrastructure 610 of a city, the data associated with population into/out of a building, block, and neighborhood may be used by the population distribution system 602 to control applications to design and plan areas suitable for metro construction. The areas suitable for metro construction may be determined based on the capacity of population to travel in some particular area. If population going to some particular areas is less, then public transport such as bus services may be provided.

In an example embodiment, for city level planning 612, the population distribution system 602 may use data associated with population into/out of a building, block, and neighborhood to control applications for installing devices for surveillance and monitoring of streets to improve safety and automobile vigilance. Security cameras may be installed in public spaces to monitor crimes and other unwanted activities. The population distribution system 602 may be configured to control applications for public space planning 614, such as parks, playgrounds for kids near residential areas and other services such as small markets.

The population distribution system 602 may be configured to update map data for the one or more buildings, based on the determined population distribution of users associated with the one or more buildings. Therefore, the data or information provided by the population distribution system may be updated on map database that may be retrieved later by organizations for optimizing the city services such as to improve public space planning, for city level planning and designing and infrastructure of the city.

Therefore, the mobility features associated with determined population distribution into/out of a building, block, and neighborhood may facilitate data service innovations by controlling an array of applications on the one or more UE, such as mobile phones. Mobile service applications on the mobile phones may be controlled by the population distribution system 602, based on mobility features related to individuals as well as communities. Therefore, embodiments of the population distribution system 602 may provide user experiences based on the mobility patterns extracted from the sensors on the UE of the users. The population distribution system 602 may facilitate complex dynamic interactions among components of the population distribution system 602. The components of the population distribution system 602 may include, but not limited to, population, resources (such as shelter, and space), and environment.

FIGS. 7A and 7B collectively illustrate schematic diagrams 700A and 700B in an exemplary scenario for using a system for determining user profile of one or more users in one or more buildings in a geographic region, in accordance with an embodiment. FIGS. 7A and 7B is explained in conjunction with FIG. 1 to FIG. 6.

With reference to FIG. 7A, there is shown a system 702, user equipment (UE) 704, a server 706, a machine learning model 708, sensor data 710, user profiling data 712 and different user profiles 714, 716 and 718. The system 702 may comprise at least one non-transitory memory configured to store computer executable instructions and at least one processor configured to execute the computer executable instructions. The system 702 may be communicatively coupled to the UE 704 and the server 706, via a network (not shown in the FIG. 7A). In accordance with an embodiment, the system 702 may be embodied in the UE 704.

In accordance with an embodiment, the UE 704 may transmit the sensor data 710 immediately to the system 102. In accordance with an alternate embodiment, the UE 704 may transmit the sensor data 710 to the system 102 in batches from the server 706. In such a case, the system 702 may access the one or more UE (such as, the UE 704) periodically for obtaining the sensor data, via the server 706.

The system 702 may be configured to obtain mobility features associated with the one or more buildings in a geographic region. The system 702 may be configured to determine, using a trained machine learning model (such as the machine learning model 708), one or more transport modes for the one or more buildings, based on the mobility features. The one or more transport modes for the one or more buildings may include, but not limited to, stairs, elevators and escalators.

The determination of the one or more transport modes is important for activity recognition associated with various user profiles. For example, a user that utilizes a stair case may be more health aware user as compared to the one using the elevator. A user that is using the stairs should burn more calories than riding the elevator for a same trip.

The system 702 may be configured to obtain indoor mobility data of the one or more users, based on the one or more transport modes for the one or more buildings. The indoor mobility data corresponds to information indicating user-preferred commuting ways within a building. The indoor mobility data may include at least one of a mode of commute used by the user, or a number of times the user used the mode of transport within a defined time period. For example, when visiting a mall with a stroller, a user hardly uses the stairs (unlike when visiting without a stroller one can use the stairs and the escalators). Health aware users might use stairs more often. Further new visitors and recurrent visitors might change their mobility patterns. As an example, if a user always takes the elevators in other buildings and starts by taking the stairs at a building the user visits. If the former behavior is due to the user being a "new" visitor, over time the user may start taking the elevator instead and returning to "natural" indoor mobility pattern. Such different behaviors of the users may be extracted by the system 702 with the help of standard user-profiling tools. The mode of commute used often by the user may be determined as preferred mode of commute within building for the user. The above mentioned commuting behaviors of users may be captured and stored in the system 702 as indoor mobility data, and later the indoor mobility data may be used by the system 702 to determine the user profile of the one or more users in the one or more buildings.

In accordance with an embodiment, the processor of the system 702 may train the machine learning model 708 to determine the one or more transport modes for one or more buildings in a geographic region. In accordance with an embodiment, the machine learning model 708 may be trained offline to obtain a classifier model to determine the one or more transport modes for one or more buildings in a geographic region as a function of mobility features. For the training of the machine learning model 708, different feature selection techniques and classification techniques may be used. Examples of the machine learning model 708 may include, but not limited to, Decision Tree (DT), Random Forest, and Ada Boost. In accordance with an embodiment, the memory may include processing instructions for training of the machine learning model 708 with data set that may be real-time (or near real time) data or historical data. In accordance with an embodiment, the data may be obtained from one or more service providers.

The processor of the system 702 may be further configured to obtain the trained machine learning model 708 and determine mobility features from the sensor data obtained from the one or more UE, such as the UE 704 for determination of the user profile of the one or more users in the one or more buildings based on the indoor mobility data. Therefore, the processor of the system 702 may be configured to determine, using the trained machine learning model 708, the user profile of the one or more users in the one or more buildings based on the indoor mobility data. The user profile of the one or more users may comprise a health aware user, a user with a stroller, a recurrent visitor and a new visitor.

With reference to FIG. 7B, there is shown different user profiles, viz., first user profile 714, a second user profile 716 and a third user profile 718. The first user profile 714 may correspond to a health aware user that uses stairs 720 more often to burn calories and stay fit. If people are using stairs 720 very often and uses elevators rarely then people might be considered as health aware users. In such cases, people may use stairs in offices, or in apartments or while going to a fitness center.

The second user profile may correspond to elderly users who use an escalator 722 (two views of the escalators are shown in FIG. 7B) and an elevator 724. For example, if an old age person is present in a mall, then there might be a possibility that the old age person may use either the elevator 724 or the escalator 722.

The third user profile 718 may correspond to a user with a stroller who may use an elevator 726. In accordance with an embodiment, people carrying a shopping trolley with them must prefer elevator 726 instead of stairs and escalators. Such people may be seen at shopping malls. In another example, if a lady is carrying a baby in a stroller, then the lady may use elevators for obvious reasons. In such cases, the lady may be present in shopping center, hospital or hotel.

Therefore, the indoor mobility data associated with the system 702 may facilitate data service innovations by controlling an array of applications on the one or more UE, such as mobile phones. The system 702 may facilitate personalized services to the one or more users, based on the determined user profile of the one or more users in the one or more buildings which may further result in user satisfaction. The personalized services based on the determined user profiles and contextual information may help present relevant and accurate information to the one or more users.

FIGS. 8A and 8B, collectively illustrate schematic diagrams 800A and 800B in an exemplary scenario for using a system for determining mobility pattern of one or more users for one or more buildings in a geographic region, in accordance with an embodiment.

With reference to FIG. 8A, there is shown a mobility prediction system 802, a machine learning model 804, one or more user data, viz., user 1 sensor data 806, user 2 sensor data 808, and user 3 sensor data 810, and output data, viz. mobility prediction data 812 of user 1 to user N.

The mobility prediction system 802 may comprise at least one non-transitory memory configured to store computer executable instructions and at least one processor configured to execute the computer executable instructions.

The mobility prediction system 802 may be configured to obtain mobility features associated with the one or more buildings in a geographic region. The mobility features may correspond to one or more attributes of the one or more transport modes in the one or more buildings. The one or more attributes may comprise one or more of vertical mobility signals and transport mode usage at predefined epoch. The one or more attributes may further comprise mean of acceleration, standard deviation of acceleration, yx ratio of acceleration, high peak and low peak of acceleration, correlation of acceleration, and Signal Magnitude Area (SMA) of acceleration. The mobility prediction system 802 may be further configured to obtain entry-exit data of the one or more users for the one or more buildings in the geographic region. The entry-exit data and mobile features may be obtained from the one or more user data, viz., user 1 sensor data 806, user 2 sensor data 808, and user 3 sensor data 810.

The mobility prediction system 802 may be further configured to determine, using a trained machine learning model, one or more transport modes for the one or more buildings, based on the mobility features. In accordance with an embodiment, the mobility prediction system 802 may be further configured to determine, using a trained machine learning model, one or more transport modes for the one or more buildings, probabilistically instantaneously. For parking spots detection 820 (as described in FIG. 8B) by transitions of the one or more transport modes, the mobility prediction system 802 may forward the determined transport mode to the machine learning model 804 for further processing.

The mobility prediction system 802 may be further configured to determine, using the trained machine learning model, mobility pattern of the one or more users (the mobility prediction data of user 1 to user N) based on the entry-exit data of the one or more users and the one or more transport modes for the one or more buildings. The mobility patterns may correspond to travelling patterns of the one or more users (such as, user 1, user 2 and user 3) based on usage of the one or more transport modes by the users.

The mobility prediction system 802 may be further configured to control one or more mobility service applications on a user equipment based on the determined mobility pattern. The one or more mobility service applications may be associated with mobility services in the geographic region. In accordance with an embodiment, the mobility prediction system 802 may be further configured to control the one or more mobility service applications on the user equipment in near real time based on the determined mobility pattern. The mobility service applications may provide services comprising at least one of traffic congestions, expected parking spots, micro-mobility dispatch, scheduling for package deliveries, expected mobility-as-a-service demand or expected mobility-as-a-service supply.

The mobility prediction system 802 may be configured to use machine learning strategies for identifying current or past activities of one or more users, given mobility patterns of the one or more users. For example, the mobility patterns of the one or more users obtained from the sensors of UE (such as smartphones) may be utilized as training examples for the machine learning model 804. The machine learning model 804 may further identify the activity of the one or more users probabilistically. The machine learning model 804 may determine sequence of changes in the determined one or more transport modes of the one or more users.

With reference to FIG. 8B, there is shown mobility prediction services 814 which are provided by the mobility prediction system 802, a plurality of services, namely, pick up time for mobility service 816, traffic congestion 818, expected parking spots 820, and schedule time for package deliveries 822.

For expected parking spots 820, the mobility prediction system 802 may consider real-time parking observations obtained from sparse parking status detectors aggregated with historic information (i.e. mean and variance) about parking availability on a given street block. The historic information is referred to as historic availability profile and is derived from sparse and error prone parking status detectors.

For the transition scheme, the one or more transport modes determined by the mobility prediction system 802 from the sensor data of sensors (such as, a gyroscopic sensor, and an accelerometer) are first used as input to the machine learning model 804 (such as, a parking finite state machine). Given these activity transition inputs, the parking finite state machine can detect when and where the one or more users parked their vehicles and which parking spots are available.

Availability of vacant parking spaces may be calculated by external sensors such as those installed in the road surface. However, such external sensors may be expensive to deploy and maintain. The mobility prediction system 802 may be configured to obtain sensor data from sensors on mobile phones and not external sensors. External sensors may underperform in extreme weather. For example, in heavy snow these external road surface implanted sensors may be covered. Using mobile phones is cheaper, more convenient, and more flexible. The mobility prediction system 802 may use sensors available on mobile phones to infer pick up time for any mobility service 816, traffic congestion 818, expected parking spots 820, and schedule time for package deliveries 822.

Therefore, the mobility prediction system 802 may facilitate data service innovations by controlling an array of applications (finding parking spot) on the one or more UE, such as mobile phones by using sensors installed on the one or more UE. Such utilization of the sensors by the mobility prediction system 802 is cheap, convenient and flexible as compared to external sensors installed in external environment.

FIG. 9 illustrates a flowchart for implementation of an exemplary method for determining one or more types of buildings in a geographic region, in accordance with an example embodiment. FIG. 9 is explained in conjunction with FIG. 1 to FIG. 8B. The control starts at 902.

In accordance with an embodiment, a system for determining building type of one or more buildings in a geographic region may comprise means for performing each of the operations described below. In this regard, according to an example embodiment, examples of means for performing operations may comprise, for example, a processor and/or a device or circuit for executing instructions or executing an algorithm for processing information as described below.

At 902, mobility features associated with the one or more buildings may be obtained. In accordance with an embodiment, the processor may be configured to obtain mobility features associated with the one or more buildings. The mobility features may be obtained from sensor data of the one or more buildings for fixed epoch. The mobility features may correspond to one or more attributes of the one or more buildings. The one or more attributes may comprise one or more of a number of floors, usability of the one or more transport modes, speed of the one or more transport modes, a number of the one or more transport modes, or volume of the one or more transport modes.

At 904, using a trained machine learning model, one or more transport modes for the one or more buildings may be determined. The processor may be configured to determine, using a trained machine learning model, one or more transport modes for the one or more buildings, based on the mobility features. The one or more transport modes comprise at least one of a stair, an elevator, an escalator, a travellator or the like.

At 906, using the trained machine learning model, the building type of one or more buildings may be determined. The processor may be configured to determine, using the trained machine learning model, building type of the one or more buildings, based on the determined one or more transport modes. Determination of the building type of one or more buildings may correspond to classification of the one or more buildings into one or more types of buildings. The one or more types of the buildings may comprise at least one of a mall, a residential building, an office building, an educational building, or a hospital.

At 908, map data associated with the one or more buildings may be updated. The processor may be configured to update map data associated with the one or more buildings based on the classification of the one or more buildings.

At 910 the updated map data to at least one subject may be transmitted. The processor may be configured to transmit the updated map data to at least one subject. The subject may comprise at least one of a vehicle or user equipment.

At 912, input specifying information related to a first building in a geographic region may be received. The processor may be configured to receive input specifying information related to the first building in a geographic region. The input may be received from a UE of a user. In accordance with an embodiment, the input may correspond to a request for determination of a building type of the first building in the geographic region. Further, the processor may perform a search for sensor data within the geographic region. Further, the processor may obtain map data associated with the first building in the geographic region.

At 914, a notification message indicating the determination of building type of the first building may be generated. The processor may be further configured to generate a notification message indicating the determination of the building type of the first building. The control passes to the end.

Accordingly, blocks of the flowchart 900 support combinations of means for performing the specified functions and combinations of operations for performing the specified functions for performing the specified functions. It will also be understood that one or more blocks of the flowchart 900, and combinations of blocks in the flowchart 900, can be implemented by special purpose hardware-based computer systems which perform the specified functions, or combinations of special purpose hardware and computer instructions.

FIG. 10 illustrates a flowchart for implementation of an exemplary method for determining population distribution of users for one or more buildings in a geographic region, in accordance with an example embodiment. FIG. 10 is explained in conjunction with FIG. 1 to FIG. 9. The control starts at 1002.

In accordance with an embodiment, a system for determining population distribution of users associated with one or more buildings in a geographic region may comprise means for performing each of the operations described below. In this regard, according to an example embodiment, examples of means for performing operations may comprise, for example, a processor and/or a device or circuit for executing instructions or executing an algorithm for processing information as described below.

At 1002, mobility features associated with one or more buildings in a geographic region may be obtained. The processor may be configured to obtain mobility features associated with the one or more buildings in the geographic region.

At 1004, one or more transport modes for the one or more buildings may be determined. The processor may be further configured to determine, using a trained machine learning model, the one or more transport modes for the one or more buildings.

At 1006, population distribution of the users associated with the one or more buildings in the geographic region may be determined. The processor may be configured to determine, using trained machine learning model, the population distribution of the users for the one or more buildings in the geographic region at a fixed epoch based on the determined one or more transport modes.

At 1008, map data for the one or more buildings may be updated. The processor may be configured to update the map data for the one or more buildings, based on the determined population distribution of users associated with the one or more buildings.

At 1010, the updated map data may be transmitted to at least one subject. The processor may be configured to transmit the updated map data to at least one subject, wherein the subject comprises at least one of a vehicle or user equipment.

At 1012, one or more geo-location service applications may be controlled on user equipment. The processor may be configured to control one or more geo-location service applications on user equipment based on the determined population distribution of the users associated with the one or more buildings in the geographic region. The one or more geo-location service applications may be associated with geo-location services in the geographic region. The geo-location services may comprise, but not limited to, street light volume, scheduling, trash pickup time, street congestion, traffic planning, parking planning, transportation planning, public space planning, and city level planning. The control passes to the end.

Accordingly, blocks of the flowchart 1000 support combinations of means for performing the specified functions and combinations of operations for performing the specified functions for performing the specified functions. It will also be understood that one or more blocks of the flowchart 1000, and combinations of blocks in the flowchart 1000, can be implemented by special purpose hardware-based computer systems which perform the specified functions, or combinations of special purpose hardware and computer instructions.

FIG. 11 illustrates a flowchart for implementation of an exemplary method for determining a user profile of one or more users in one or more buildings in a geographic region, in accordance with an embodiment. FIG. 11 is explained in conjunction with FIG. 1 to FIG. 10. The control starts at 1102.

In accordance with an embodiment, a system for determining a user profile of one or more users in one or more buildings in a geographic region may comprise means for performing each of the operations described below. In this regard, according to an example embodiment, examples of means for performing operations may comprise, for example, a processor and/or a device or circuit for executing instructions or executing an algorithm for processing information as described below.

At 1102, mobility features associated with the one or more buildings in a geographic region may be obtained. The processor may be configured to obtain the mobility features associated with the one or more buildings in the geographic region. The mobility features may comprise at least one of one or more vertical mobility signals, or one or more transport mode usage.

At 1104, one or more transport modes may be determined for the one or more buildings. The processor may be configured to determine, using a trained machine learning model, the one or more transport modes for the one or more buildings, based on the mobility features.

At 1106, indoor mobility data of the one or more users may be obtained. The processor may be configured to obtain indoor mobility data of the one or more users based on the one or more transport modes for the one or more buildings.

At 1108, a user profile of the one or more users may be determined in the one or more buildings. The processor may be configured to determine, using the trained machine learning model, the user profile of the one or more users in the one or more buildings based on the indoor mobility data. The user profile of the one or more users may comprise a health aware user, a user with a stroller, a recurrent visitor and a new visitor. The control passes to the end.

Accordingly, blocks of the flowchart 1100 support combinations of means for performing the specified functions and combinations of operations for performing the specified functions for performing the specified functions. It will also be understood that one or more blocks of the flowchart 1100, and combinations of blocks in the flowchart 1100, can be implemented by special purpose hardware-based computer systems which perform the specified functions, or combinations of special purpose hardware and computer instructions.

FIG. 12 illustrates a flowchart for implementation of an exemplary method for determining mobility pattern of one or more users for one or more buildings in a geographic region, in accordance with an embodiment. FIG. 12 is explained in conjunction with FIG. 1 to FIG. 3. The control starts at 1202.

In accordance with an embodiment, a system for determining mobility pattern of one or more users for one or more buildings in a geographic region may comprise means for performing each of the operations described below. In this regard, according to an example embodiment, examples of means for performing operations may comprise, for example, a processor and/or a device or circuit for executing instructions or executing an algorithm for processing information as described below.

At 1202, mobility features associated with the one or more buildings in a geographic region, entry-exit data of the one or more users for the one or more buildings in the geographic region may be obtained. The processor may be configured to obtain the mobility features associated with the one or more buildings in the geographic region and entry-exit data of the one or more users for the one or more buildings in the geographic region.

At 1204, one or more transport modes may be determined for the one or more buildings. The processor may be further configured to determine, using a trained machine learning model, the one or more transport modes for the one or more buildings, based on the mobility features.

At 1206, mobility pattern of the one or more users may be determined. The processor may be configured to determine, using the trained machine learning model, the mobility pattern of the one or more users based on the entry-exit data of the one or more users and the one or more transport modes for the one or more buildings.

At 1208, one or more mobility service applications may be controlled on user equipment. The processor may be configured to control the one or more mobility service applications on the user equipment based on the determined mobility pattern. The one or more mobility service applications may be associated with mobility services in the geographic region. In accordance with an embodiment, the processor may be configured to control the one or more mobility service applications on the user equipment in near real time based on the determined mobility pattern. The one or more mobility service applications may provide services comprising at least one of traffic congestions, expected parking spots, micro-mobility dispatch, scheduling for package deliveries, expected mobility-as-a-service demand or expected mobility-as-a-service supply. The control passes to the end.

Accordingly, blocks of the flowchart 1200 support combinations of means for performing the specified functions and combinations of operations for performing the specified functions for performing the specified functions. It will also be understood that one or more blocks of the flowchart 1200, and combinations of blocks in the flowchart 1200, can be implemented by special purpose hardware-based computer systems which perform the specified functions, or combinations of special purpose hardware and computer instructions.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for determining one or more transport modes for one or more buildings in a geographic region, comprising:
    at least one non-transitory memory configured to store computer executable instructions; and
    at least one processor configured to execute the computer executable instructions to:
        obtain sensor data associated with the one or more buildings for a time duration;
        determine mobility features associated with the one or more buildings, based on the sensor data; and
        determine, using a trained machine learning model, the one or more transport modes for the one or more buildings, based on the mobility features.

2. The system of claim 1, wherein the at least one processor is further configured to update map data associated with the one or more buildings, based on the determined one or more transport modes.

3. The system of claim 2, wherein the at least one processor is further configured to transmit the updated map data to at least one subject, wherein the subject comprises at least one of a vehicle or a user equipment.

4. The system of claim 1, wherein the at least one processor is further configured to obtain the sensor data from one or more user equipment.

5. The system of claim 1, the at least one processor is further configured to calculate confidence scores for each of the mobility features, wherein the confidence scores correspond to a rank of each of the mobility features, and wherein an order of the rank starts with a top ranked mobility feature that corresponds to a most informative mobility feature.

6. The system of claim 5, wherein to determine the one or more transport modes, the at least one processor is further configured to reject the one or more transport modes using the trained machine learning model, based on a difference of subsequent confidence scores of the mobility features being less than a threshold value.

7. The system of claim 1, wherein the at least one processor is further configured to determine a mobility feature vector of each of the mobility features, wherein the mobility feature vector corresponds to a numerical representation of the one or more transport modes.

8. The system of claim 7, wherein the at least one processor is further configured to classify the one or more transport modes using the trained machine learning model, based on the mobility feature vector.

9. The system of claim 8, wherein the one or more transport modes comprise at least one of a stair, an elevator, an escalator or none.

10. The system of claim 1, wherein the mobility features comprise one or more of spatial features, temporal features, and statistical features.

11. The system of claim 10, wherein the mobility features correspond to one or more attributes of the one or more transport modes in the one or more buildings, wherein the one or more attributes comprise one or more of vertical mobility signals and transport mode usage at predefined epoch.

12. The system of claim 1, wherein the machine learning model corresponds to a selective-learning machine learning model.

13. A method for determining one or more transport modes for one or more buildings in a geographic region, comprising:
    obtaining sensor data associated with the one or more buildings for a time duration;
    determining mobility features associated with the one or more buildings, based on the sensor data; and
    determining, using a trained machine learning model, the one or more transport modes for the one or more buildings, based on the mobility features.

14. The method of claim 13, wherein the method further comprises updating map data associated with the one or more buildings, based on the determined one or more transport modes.

15. The method of claim 13, wherein the method further comprises obtaining the sensor data from one or more user equipment.

16. The method of claim 13, wherein the method further comprises calculating confidence scores for each of the mobility features, wherein the confidence scores correspond to a rank of each of the mobility features, and wherein an order of the rank starts with a top ranked mobility feature that corresponds to a most informative mobility feature.

17. The method of claim 16, wherein to determine the one or more transport modes, the method is further configured to reject the one or more transport modes using the trained machine learning model, based on a difference of subsequent confidence scores of the mobility features being less than a threshold value.

18. The method of claim 13, wherein the method further comprises determining mobility feature vector of the mobility features, wherein the mobility feature vector corresponds to a numerical representation of the one or more transport modes.

19. The method of claim 18, wherein the method further comprises classifying the one or more transport modes using the trained machine learning model, based on the mobility feature vector.

20. A computer program product comprising a non-transitory computer readable medium having stored thereon computer executable instructions, which when executed by one or more processors, cause the one or more processors to carry out operations for determining the one or more transport modes, the operations comprising:
   obtaining sensor data associated with the one or more buildings for a time duration;
   determining mobility features associated with the one or more buildings, based on the sensor data; and
   determining, using a trained machine learning model, the one or more transport modes for the one or more buildings, based on the mobility features.

* * * * *